(12) United States Patent  
Takahashi et al.

(10) Patent No.: US 9,206,850 B2  
(45) Date of Patent: Dec. 8, 2015

(54) SENSOR-EQUIPPED BEARING DEVICE FOR WHEEL HAVING INTEGRATED IN-WHEEL MOTOR

(75) Inventors: Toru Takahashi, Iwata (JP); Kiyotake Shibata, Iwata (JP); Minoru Suzuki, Iwata (JP)

(73) Assignee: NTN CORPORATION, Osaka (JP)

( * ) Notice: Subject to any disclaimer, the term of this patent is extended or adjusted under 35 U.S.C. 154(b) by 394 days.

(21) Appl. No.: 13/517,183

(22) PCT Filed: Dec. 14, 2010

(86) PCT No.: PCT/JP2010/072442  
§ 371 (c)(1),  
(2), (4) Date: Jun. 19, 2012

(87) PCT Pub. No.: WO2011/078006  
PCT Pub. Date: Jun. 30, 2011

(65) Prior Publication Data  
US 2012/0256472 A1 Oct. 11, 2012

(30) Foreign Application Priority Data  
Dec. 21, 2009 (JP) ................................. 2009-288914

(51) Int. Cl.  
*G01P 3/48* (2006.01)  
*G01P 3/54* (2006.01)  
(Continued)

(52) U.S. Cl.  
CPC .............. *F16C 41/007* (2013.01); *B60K 7/0007* (2013.01); *B60K 17/046* (2013.01); *B60K 2007/0092* (2013.01); *F16C 19/186* (2013.01); *F16C 2326/02* (2013.01)

(58) Field of Classification Search  
CPC .............. G06F 11/30; G01P 3/48; G01P 3/54  
USPC .......................................... 324/174; 384/448  
See application file for complete search history.

(56) References Cited

U.S. PATENT DOCUMENTS 4,090,751 A * 5/1978 Krude ........................... 384/498  
4,458,958 A * 7/1984 Kapaan et al. ................. 384/538  
(Continued)

FOREIGN PATENT DOCUMENTS

CN 101370680 2/2009  
CN 101516663 8/2009  
(Continued)

OTHER PUBLICATIONS

Japanese Office Action issued Jul. 9, 2013 in corresponding Japanese Application No. 2009-288914.  
(Continued)

*Primary Examiner* — Patrick Assouad  
*Assistant Examiner* — Lamarr Brown

(57) ABSTRACT

To provide a sensor equipped and in-wheel motor incorporated bearing device for a vehicle wheel, which is capable of accurately detecting a rotating condition of a vehicle drive wheel and is effective to accurately control an electric drive motor or an automotive vehicle, the sensor equipped and in-wheel motor incorporated bearing device includes a wheel support bearing assembly for rotatably supporting a hub of the vehicle drive wheel, an electric drive motor providing a rotation device source for the vehicle drive wheel, and a speed reducing mechanism interposed between the electric drive motor and the wheel support bearing assembly. A rotation detecting device is also provided for detecting the rotation of an output shaft of the speed reducing mechanism.

13 Claims, 17 Drawing Sheets

(51) Int. Cl.
*F16C 41/00* (2006.01)
*B60K 7/00* (2006.01)
*B60K 17/04* (2006.01)
*F16C 19/18* (2006.01)

(56) References Cited

U.S. PATENT DOCUMENTS

| | | | |
|---|---|---|---|
| 4,829,834 A * | 5/1989 | Masom | 73/862.326 |
| 5,223,760 A * | 6/1993 | Peck et al. | 310/168 |
| 5,323,279 A * | 6/1994 | Yokomachi et al. | 360/96.2 |
| 6,011,388 A * | 1/2000 | Miyazaki et al. | 324/174 |
| 6,492,787 B1 * | 12/2002 | Hibino et al. | 318/568.11 |
| 6,894,484 B2 * | 5/2005 | Takizawa et al. | 324/174 |
| 6,958,599 B2 * | 10/2005 | Scotson et al. | 324/174 |
| 7,374,343 B2 * | 5/2008 | Nakajima et al. | 384/448 |
| 7,452,133 B2 * | 11/2008 | Ohtsuki et al. | 384/448 |
| 7,692,422 B2 * | 4/2010 | Yamamoto et al. | 324/174 |
| 7,741,838 B2 * | 6/2010 | Takahashi et al. | 324/160 |
| 7,825,653 B2 | 11/2010 | Ueno et al. | |
| 8,002,060 B2 | 8/2011 | Komatsu | |
| 8,307,931 B2 | 11/2012 | Akamatsu | |
| 8,798,906 B2 * | 8/2014 | Shibata | 701/300 |
| 2002/0130655 A1 * | 9/2002 | Okada et al. | 324/174 |
| 2003/0222617 A1 * | 12/2003 | Nakai et al. | 318/701 |
| 2004/0008002 A1 * | 1/2004 | Kamio et al. | 318/701 |
| 2004/0066166 A1 * | 4/2004 | Nakai et al. | 318/701 |
| 2005/0135719 A1 * | 6/2005 | Takaki et al. | 384/523 |
| 2006/0045406 A1 * | 3/2006 | Iwamoto et al. | 384/910 |
| 2006/0159377 A1 * | 7/2006 | Shigeoka et al. | 384/448 |
| 2006/0164030 A1 * | 7/2006 | Kujira et al. | 318/439 |
| 2006/0269181 A1 * | 11/2006 | Hattori et al. | 384/544 |
| 2007/0014498 A1 * | 1/2007 | Aoki et al. | 384/448 |
| 2007/0193791 A1 | 8/2007 | Komatsu | |
| 2007/0205759 A1 * | 9/2007 | Ito | 324/174 |
| 2007/0213162 A1 * | 9/2007 | Takasaki | 475/5 |
| 2007/0273362 A1 * | 11/2007 | Nakajima et al. | 324/174 |
| 2008/0012421 A1 * | 1/2008 | Shige et al. | 301/126 |
| 2008/0111326 A1 * | 5/2008 | Taneda et al. | 280/5.511 |
| 2008/0246429 A1 * | 10/2008 | Atarashi et al. | 318/772 |
| 2009/0032342 A1 * | 2/2009 | Yamaguchi | 188/72.3 |
| 2009/0038414 A1 * | 2/2009 | Ozaki et al. | 73/862.381 |
| 2009/0097791 A1 * | 4/2009 | Ozaki et al. | 384/448 |
| 2009/0114004 A1 * | 5/2009 | Ozaki et al. | 73/117.01 |
| 2009/0152057 A1 * | 6/2009 | Yamamoto et al. | 188/72.7 |
| 2009/0236157 A1 | 9/2009 | Akamatsu | |
| 2009/0267593 A1 * | 10/2009 | Goto et al. | 324/207.25 |
| 2009/0320613 A1 * | 12/2009 | Uehira et al. | 73/862.333 |
| 2010/0000811 A1 | 1/2010 | Iwano | |
| 2010/0019761 A1 * | 1/2010 | Ueno et al. | 324/207.25 |
| 2010/0046873 A1 * | 2/2010 | Takimoto et al. | 384/478 |
| 2010/0104231 A1 * | 4/2010 | Norimatsu | 384/448 |
| 2010/0135604 A1 * | 6/2010 | Ozaki et al. | 384/448 |
| 2010/0220943 A1 * | 9/2010 | Mikami et al. | 384/13 |
| 2010/0237752 A1 * | 9/2010 | Yoshikawa et al. | 310/68 B |
| 2012/0116664 A1 * | 5/2012 | Shibata | 701/300 |
| 2012/0177315 A1 * | 7/2012 | Matsuki et al. | 384/478 |
| 2013/0267365 A1 * | 10/2013 | Gunji et al. | 475/5 |

FOREIGN PATENT DOCUMENTS

| | | | |
|---|---|---|---|
| JP | 2006-315595 | | 11/2006 |
| JP | 2007-16846 | | 1/2007 |
| JP | 2007-221947 | | 8/2007 |
| JP | 2007278728 | * | 10/2007 |
| JP | WO2008/035455 A1 | * | 3/2008 |
| JP | 2008-74135 | | 4/2008 |
| JP | 2008-131686 | | 6/2008 |
| JP | 2008-249353 | | 10/2008 |
| WO | WO 2007/083800 | | 7/2007 |

OTHER PUBLICATIONS

International Preliminary Report on Patentability mailed Jul. 19, 2012 in corresponding International Patent Application No. PCT/JP2010/072442.
International Search Report of Corresponding PCT Application PCT/JP2010/072442 mailed Feb. 22, 2011.
U.S. Appl. No. 12/311,109, filed Mar. 19, 2009, Yoshinobu Akamatsu, NTN Corporation.
Chinese Office Action dated Jul. 2, 2014 in corresponding Chinese Patent Application No. 201080058457.8.

* cited by examiner

OUTBOARD SIDE

INBOARD SIDE

SENSOR-EQUIPPED BEARING DEVICE FOR WHEEL HAVING INTEGRATED IN-WHEEL MOTOR

CROSS REFERENCE TO RELATED APPLICATIONS

This application is a national phase application, under 35 U.S.C. 371, of international application No. PCT/JP2010/072442, filed on Dec. 14, 2010, which claimed priority to Japanese Patent Application No. 2009-288914, filed on Dec. 21, 2009, the disclosures of which are incorporated herein by reference.

BACKGROUND OF THE INVENTION

1. Field of the Invention

The present invention relates to a sensor equipped and in-wheel motor incorporated bearing device for the support of a vehicle wheel, including a wheel support bearing assembly, a speed reducing mechanism and an electric drive motor combined together, in which a rotation detecting device for detecting the number of revolutions of a vehicle drive wheel is provided.

2. Description of Related Art

As a control scheme for controlling the travelling stability of an electrically powered vehicle utilizing in-wheel motor incorporated wheel support bearing devices, each employing a combination of a wheel support bearing assembly, a reduction gear mechanism and a brake, the use has been suggested of a sensor for measuring forces acting in three axis directions perpendicular to the point of contact between the drive wheel and the road surface, from a condition of at least one of the wheel support bearing assembly, the electric drive motor, the reduction gear mechanism and the brake. In this connection, see the patent documents 1 listed below.

[Patent Document 1] JP Laid-open Patent Publication No. 2008-74135
[Patent Document 2] JP Laid-open Patent Publication No. 2008-249353

SUMMARY OF THE INVENTION

The in-wheel motor incorporated wheel support bearing device of the type referred to above, the electric drive motor makes use of a rotation detecting device for control purpose. However, since an output of the electric drive motor is transmitted to a wheel support bearing assembly through a speed reducing mechanism, the rotational characteristic of the electric drive motor tends to be different from that of the wheel support bearing assembly. For this reason, the torque transmitted from a drive wheel to the electric drive motor through the speed reducing mechanism fails to be accurately transmitted to a rotor of the electric drive motor. Accordingly, the torque on the drive wheel will not be faithfully reflected on a detection signal of the rotation detecting device, which detects the number of revolutions of the electric drive motor. Rather, the signal detected by the rotation detecting device in this case tends to represent the signal, which involves unevenness in rotation of the electric drive motor.

Accordingly, if the rotation of a vehicle drive wheel is observed with the use of the detection signal of the rotation detecting device installed in the electric drive motor, difficulties have hitherto been encountered in detecting an accurate rotating condition.

Also, if the conventional standard rotation detecting device for a vehicle wheel is employed in order to observe the vehicle drive wheel, the rotation detecting capability is insufficient to such an extent that no precise rotation detection can be accomplished, because the resolving power of that rotation detecting device is about 40 to 50 pulses per complete revolution of the vehicle drive wheel. In view of this, in order to precisely control the electric drive motor and/or an automotive vehicle itself in the electrically powered vehicle employing the in-wheel motor incorporated wheel support bearing device, a function of accurately detecting the rotating condition of the vehicle drive wheel is needed.

It is to be noted that the patent document 2, listed above, suggests a rotation detecting device of a type, which is utilized in combination with a sensor having a magnetic encoder and a multiplying function to perform the rotation detection at a high resolving power and an error in a multiplying circuit is cancelled to enable the rotational velocity to be detected, but nothing has been suggested to use such a rotation detecting device in the in-wheel motor incorporated wheel support bearing device.

In view of the foregoing, the present invention has for its primary object to provide an in-wheel motor incorporated, sensor equipped wheel support bearing device, which is capable of accurately detecting the rotating condition of the vehicle drive wheel and which is effective in precisely controlling an electric drive motor and/or an automotive vehicle.

In order to accomplish the foregoing object, the sensor equipped and in-wheel motor incorporated bearing device for the support of a vehicle wheel, which is designed in accordance with the present invention, includes a wheel support bearing assembly for rotatably supporting a hub of a vehicle drive wheel; an electric drive motor forming a rotation drive source for the vehicle drive wheel; a speed reducing mechanism interposed between the electric drive motor and the wheel support bearing assembly; and a rotation detecting device for detecting the rotation of an output shaft of the speed reducing mechanism. With the sensor equipped and in-wheel motor incorporated bearing device so constructed as hereinabove described, in which the rotation detecting device for detecting the rotation of the output shaft of the speed reducing mechanism is provided, a rotating condition of the vehicle wheel can be accurately detected. Accordingly, it is possible to accurately estimate a condition of the road surface and/or a condition of contact of the vehicle drive wheel and the road surface and does, therefore, become effective to accurately control an electric drive motor and/or an automotive vehicle.

In the present invention, the rotation detecting device referred to above preferably include an encoder provided in a rotatable raceway ring of the wheel support bearing assembly or a member integral with such rotatable raceway ring and having a plurality of to-be-detected magnetic poles arranged equidistantly in a circumferential direction; a sensor provided in a stationary raceway ring of the wheel support bearing assembly or a member integral with such stationary raceway ring for detecting the to-be-detected magnetic poles of the encoder to generate pulses; and a multiplying section for multiplying the pulses, generated by the sensor, to form multiplied pulses. In the case of this construction, the multiplied pulses are formed by multiplying pulses generated by the sensor, with the use of the multiplying section and, therefore, the rotation detection of the vehicle drive wheel can be performed with a high resolution.

In the present invention, the rotation detecting device may include a velocity detecting section for detecting, each time the multiplying section forms a multiplied pulse, an average velocity of the encoder during the interval in the past, in which the latest pieces of the multiplied pulses have been formed. The number of the pieces of the multiplied is equal to a multiplication factor by which the pulses formed in the past have been multiplied. In the case of this construction, the rotational velocity can be detected with an error in a multiplying circuit being cancelled and, accordingly, the rotational velocity of the vehicle drive wheel can be detected with a high resolution.

In the present invention, the use may be made of a contact condition detecting section for calculating a change in rotational velocity detected by the rotation detecting device and then outputting information descriptive of a condition of contact of the vehicle drive wheel with a road surface.

In the case of the construction described above, the condition of the road surface and/or the condition of contact of the vehicle drive wheel and the road surface can be accurately estimated. Also, if the information obtained from the contact condition detecting section is used in controlling the automotive vehicle and/or the electric drive motor, the safety factor and the economical efficiency can be increased.

In the present invention, the use may be made of a brake for applying a brake force to the hub of the vehicle drive wheel, in which case the contact condition detecting section is operable, in addition to the calculation of the change in rotational velocity, to output information descriptive of the contact condition by means of utilizing respective estimated values or respective measured values of a drive torque of the electric drive motor and a brake force acting on the brake. In the case of this construction, it is possible to determine, from the drive torque of the electric drive motor and the brake force acting on the brake, under what driving condition the change in rotational velocity calculated through the calculation performed by the contact condition detecting section is developed Accordingly, the estimating accuracy of, for example, the condition of the road surface can be improved.

In the present invention, an output cable extending from the rotation detecting device and an output cable extending from the electric drive motor may be bundled together. In the case of this construction, since the output cable of the rotation detecting device and the output cable of the electric drive motor can be drawn outwardly from one and the same site in a bundled form and, accordingly, wiring of the cables can be facilitated, accompanied by the increase of the reliability.

In the present invention, an encoder of the rotation detecting device may be provided between a plurality of rows of the rolling surfaces in the wheel support bearing assembly.

In the present invention, the encoder of the rotation detecting device may be provided in an inboard end of the wheel support bearing assembly.

In the present invention, the encoder of the rotation detecting device may be provided as a part of a sealing member used to seal an inboard end of an annular space delimited between a stationary raceway ring and a rotatable raceway ring, both raceway rings forming respective parts of the wheel support bearing assembly.

In the present invention, the encoder of the rotation detecting device may be provided on an output shaft of the speed reducing mechanism.

In the present invention, the use may be made of a current sensor for measuring a current value of the electric drive motor and a load estimating section for estimating a action force, acting on the point of contact of the vehicle drive wheel with a road surface in a direction parallel to a direction of travel, from an output of the current sensor. Since the amount of electric current flowing through the electric drive motor varies depending on the magnitude of the action force acting on the point of contact of the vehicle drive wheel with the road surface in a direction parallel to the direction of travel, the magnitude of the above described action force can be calculated if the relation between the action force and the amount of the electric current is determined beforehand by means of a series of experiments and/or simulations. The load estimating section referrers to the relation between the action force and the amount of the electric current, so determined by means of the experiments and/or simulations, to calculate from the output of the current sensor, the action force acting on the point of contact between the vehicle drive wheel and the road surface in the direction parallel to the direction of travel. The action force acting in the direction parallel to the direction of travel can be determined accurately in this way.

In the present invention, the use is preferably recommended of a brake for applying a brake force to a hub of the vehicle drive wheel, a braking force sensor for measuring the brake force applied to the brake, and a load estimating section for estimating a action force, acting on the point of contact of the vehicle drive wheel with a road surface in a direction parallel to a direction of travel, from an output of the braking force sensor. Since the magnitude of the brake force (that is, a braking force) to be applied to the brake varies depending on the magnitude of the action force acting on the point of contact between the vehicle drive wheel and the road surface in the direction parallel to the direction of travel, the magnitude of the above described action force can be calculated if the relation between the action force and the brake force is determined beforehand by means of a series of experiments and/or simulations. The load estimating section referrers to the relation between the action force and the brake force, so determined by means of the experiments and/or simulations, to calculate from the output of the brake force sensor, the action force acting on the point of contact between the vehicle drive wheel and the road surface in the direction parallel to the direction of travel. The action force acting in the direction parallel to the direction of travel can be determined accurately in this way.

In the present invention, the use may be made of a strain sensor provided in a stationary raceway ring of the wheel support bearing assembly for measuring a strain occurring in the stationary raceway ring and a load estimating section for estimating, from an output of the strain sensor, at least an action force acting in one axis direction of action forces acting on the point of contact of the vehicle drive wheel with a road surface in three axis directions that are perpendicular to each other. Since the change in axially acting strain occurring in the vehicle drive wheel varies depending on the magnitude of the axially acting action force, which acts on the point of contact between the vehicle drive wheel and the road surface, the magnitude of the above described action force can be calculated if the relation between the action force and the axially acting strain is determined beforehand by means of a series of experiments and/or simulations. The load estimating section referrers to the relation between the action force and the axially acting strain, so determined by means of the experiments and/or simulations, to calculate from the output of the axially acting force sensor, the action force acting on the point of contact between the vehicle drive wheel and the road surface in the axial direction. The action force acting in the axial direction can be determined accurately in this way.

In the present invention, the use may be made of at least three or more strain sensors provided in a stationary raceway ring of the wheel support bearing assembly for measuring strains in the stationary raceway ring and a load estimating section for estimating, from respective outputs of the strain sensors, action forces acting on the point of contact of the vehicle drive wheel with a road surface in three axis directions.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

FIGS. 1 to 22 illustrate a first preferred embodiment of the present invention. The summary of this embodiment will first be described with particular reference to FIG. 1. A sensor equipped and in-wheel motor incorporated wheel support bearing device shown therein includes a wheel support bearing assembly A for rotatably supporting a hub for a vehicle drive wheel 70, an electric drive motor B as a rotary drive source, a speed reducing mechanism C for reducing and transmitting the rotational velocity of the electric drive motor B, and a brake D for applying a braking force to the hub. All of those component parts A, B, C and D are arranged on a center axis O. It does not necessarily means that all of those component parts are directly attached to the center axis O, but means that all of those component parts work functionally relative to the center axis O. It is to be noted that hereinafter in this specification, terms "outboard" and "inboard" are to be understood as representing one side of the vehicle body away from the longitudinal center of the vehicle body and the other side of the vehicle body close to the longitudinal center of the vehicle body, respectively, when assembled in the vehicle body.

Figure 2:
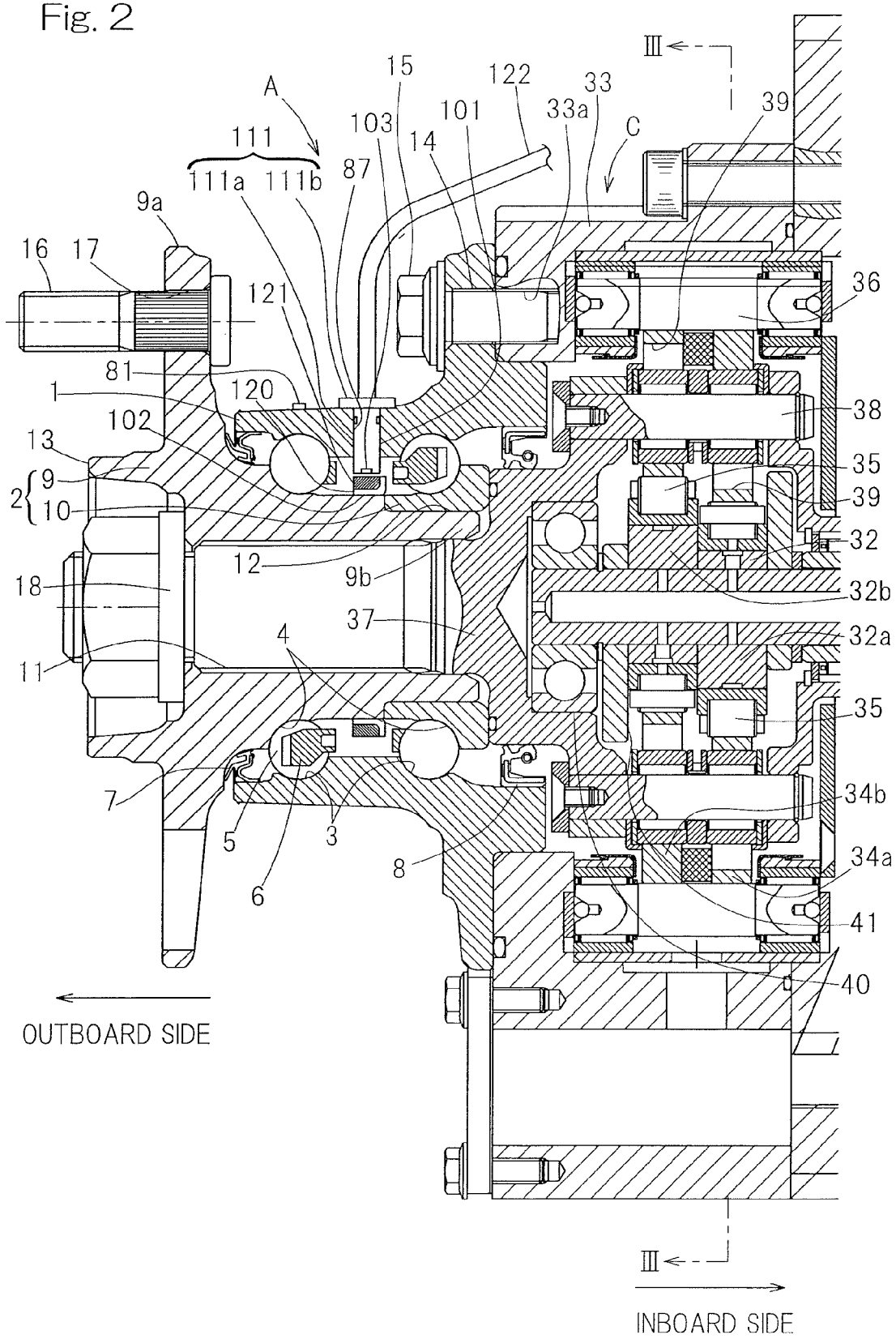
FIG. 2 is a sectional view showing a wheel support bearing assembly and a speed reducing mechanism, both employed in the sensor equipped and in-wheel motor incorporated bearing device shown in FIG. 1.

As shown in FIG. 2, the wheel support bearing assembly A includes an outer member 1 having an inner periphery formed with a plurality of rows of rolling surfaces 3, an inner member 2 having rolling surfaces 4 defined therein in face to face relation with the respective rolling surfaces 3, and rows of rolling elements 5 interposed respectively between the rolling surfaces 3 and 4. This wheel support bearing assembly A is of a double row angular contact ball bearing type, in which the rolling elements 5 are comprised of balls that are retained by a ball retainer 6 employed for each row. The rolling surfaces 3 and 4 referred to above represent an arcuately sectioned shape and are so formed as to have respective ball contact angles held in back-to-back relation to each other. Opposite inboard and outboard ends of a bearing space delimited between the outer member 1 and the inner member 2 are sealed by respective sealing members 7 and 8.

The outer member 1 servers as a stationary raceway ring. The outer member 1 is also of one piece structure including a flange 1a, formed in an outer periphery thereof and adapted to be secured to a casing 33 of the speed reducing mechanism C. The flange 1a has a bolt insertion hole 14 defined therein at a plurality of locations spaced from each other in a circumferential direction. This outer member 1, when a mounting bolt 15 inserted through the bolt insertion hole 14 in the flange 1a is threaded into an internally threaded hole 33a defined in the casing 33, is secured to the casing 33.

The inner member 2 serves as a rotatable raceway ring. The inner member 2 includes a hub ring 9, having a hub flange 9a for the support of a vehicle drive wheel 70 and a brake ring 46, and an inner ring 10 mounted on an outer periphery of an inboard end of a hub axle 9b of the hub ring 9. The rows of the rolling surfaces 4 referred to previously are formed respectively in the hub ring and the inner ring 10. The outer periphery of the inboard end of the hub ring 9 is radially inwardly depressed to define an inner ring mounting surface area 12 of a reduced diameter, and the inner ring 10 is mounted on this inner ring mounting surface area 12. The hub ring 9 has a center bore 11 defined therein at the center thereof. The hub flange 9a is provided with a press fitting holes 17 respectively defined at a plurality of circumferentially spaced locations for receiving therein hub bolts 16. At a root portion of the hub flange 9a of the hub ring 9, a cylindrical pilot portion 13 for guiding the vehicle drive wheel 70 and the brake ring 46 protrudes therefrom towards the outboard side. This pilot portion 13 has an inner periphery, to which a cap 18 for closing an outboard end of the center bore 11 is secured. It is to be noted that the hub ring 9 referred to above and hereinafter corresponds to the term "hub" referred to in the appended claims.

Figure 1:
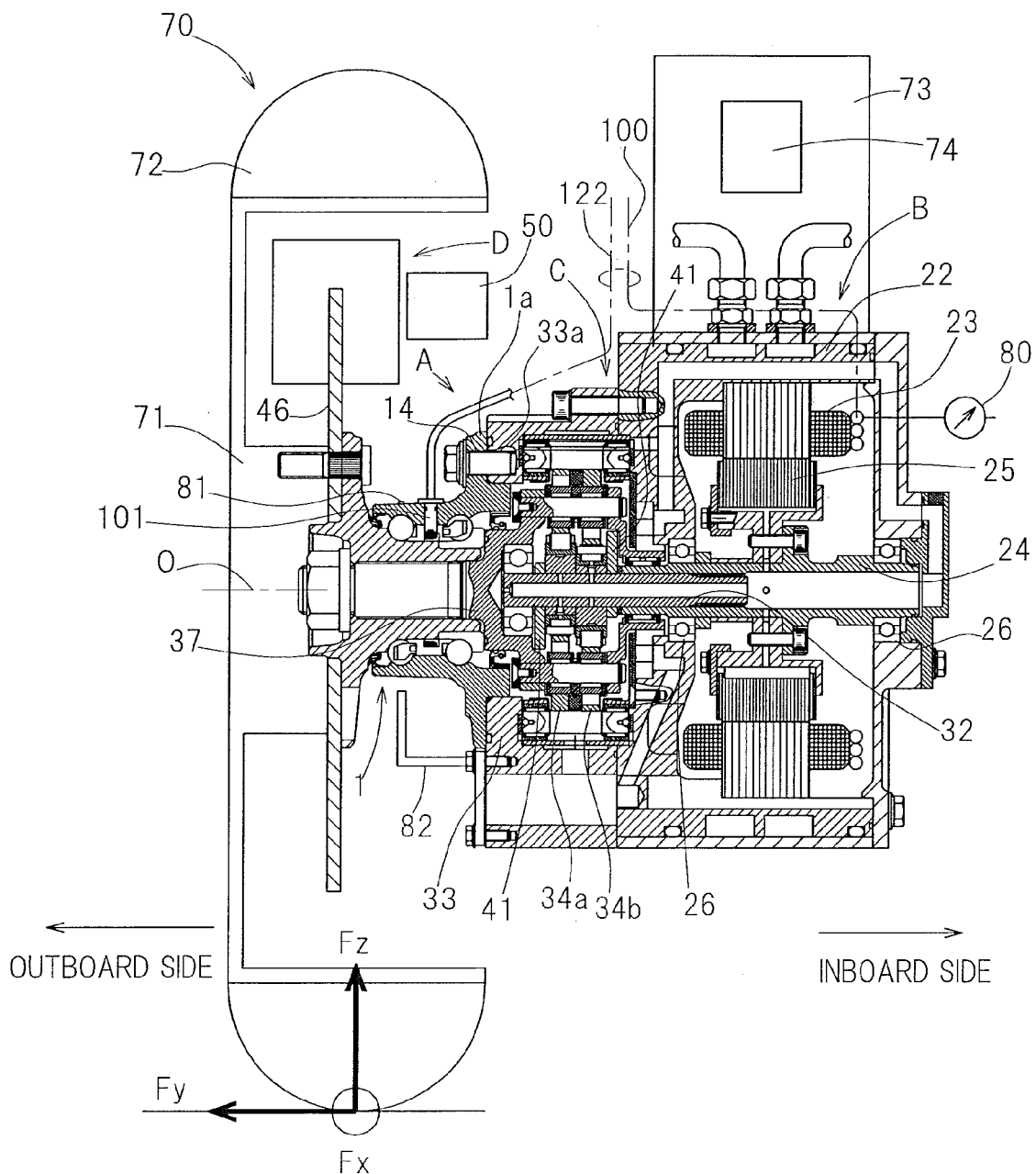
FIG. 1 is a schematic diagram showing a sensor equipped and in-wheel motor incorporated bearing device for the support of a vehicle wheel, which is designed in accordance with a first preferred embodiment of the present invention.

The electric drive motor B is of a radial gap type having a radial gap delimited between a stator 23, secured to a tubular casing 22, and a rotor 25 mounted on an output shaft 24 as shown in FIG. 1. The output shaft 24 is supported inside the casing 22 by means of two bearings 26.

Figure 3:
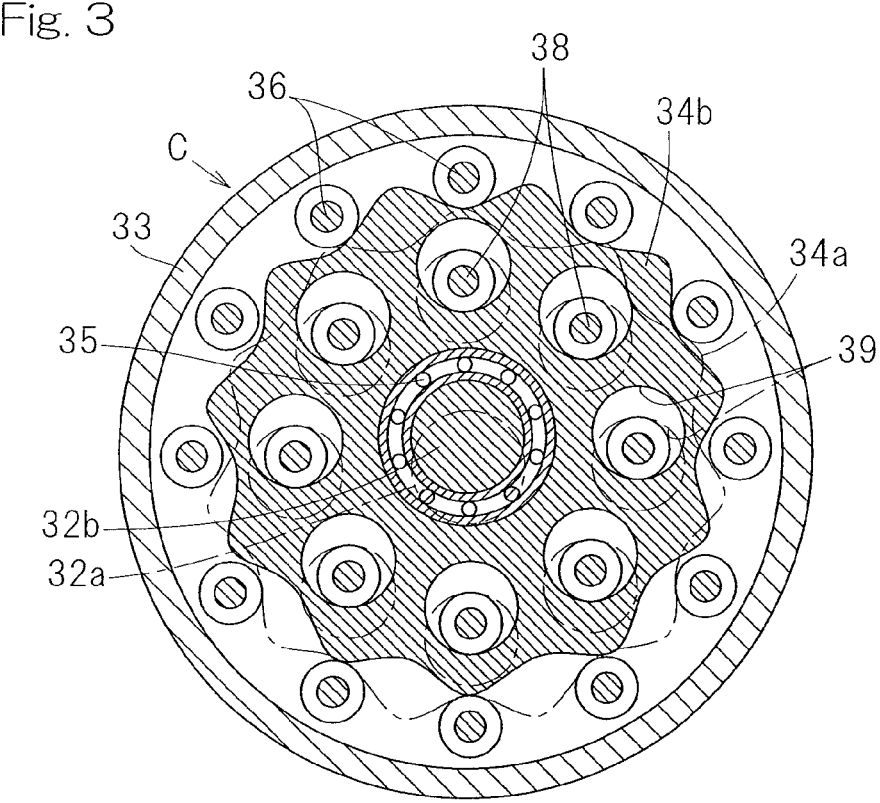
FIG. 3 is a cross sectional view taken along the line in FIG. 2.

As shown in FIGS. 2 and 3, the speed reducing mechanism C is structured as a cycloid reduction gear mechanism. In other words, this speed reducing mechanism C is of a structure, in which two curved plates 34a and 34b, each having its contour represented by a smoothly waved trochoidal curve, are mounted on respective eccentric portions 32a and 32b of an input shaft 32 through associated bearings 35; respective eccentric motions of those curved plates 34a and 34b are guided on an outer peripheral side by means of a plurality of outer pins 36 bridged between an inboard end wall and an outboard end wall of a casing 33; and a plurality of inner pins 38 fitted to an output shaft 37 splined to the center bore 11 of the hub ring 10 for rotation together therewith are inserted into the corresponding number of throughholes 39 defined inside of each of the curved plates 34a and 34b. The input shaft 32 is splined to an output shaft 24 of the electric drive motor B for rotation together therewith. It is to be noted that the input shaft 32 is supported by an inner diametric surface of the output shaft 37 and a bearing 40. Also, the trochoidal curve represented by the contour of each of the curved plates 34a and 34b is preferably a cycloid curve, but any other trochoidal curve may be employed. The term "cycloid reduction gear mechanism" referred to hereinabove and hereinafter is used to encompass a trochoidal speed reducing mechanism.

When the output shaft 24 of the electric drive motor B rotates, the curved plates 34a and 34b fitted to the input shaft 32 rotatably together with the output shaft 24 undergoes an eccentric motion. The eccentric motion of those curved plates 34a and 34b is transmitted, as a rotary motion, to the inner member 2, which is the hub of the vehicle wheel through the engagement between the inner pins 38 and the throughholes 39. Relative to the rotation of the output shaft 24, the rotation of the inner member 2 is reduced in velocity. By way of example, a single stage cycloid speed reducing mechanism is capable of providing a reduction gear ratio of 1/10 or higher.

The two curved plates 34a and 34b referred to above are mounted on the respective eccentric portions 32a and 32b of the input shaft 32 in a manner displaced 180° in phase relative to each other so that the respective eccentric movements can be counterbalanced with each other. Counterweights 41 are mounted on respective sides of each of the curved plates 34a and 34b in a manner displaced in a direction counter to the direction of eccentricity of the respective eccentric portions 32a and 32b so that vibrations induced as a result of the eccentric movements of the curved plates 34a and 34b can be counterbalanced.

Figure 4:
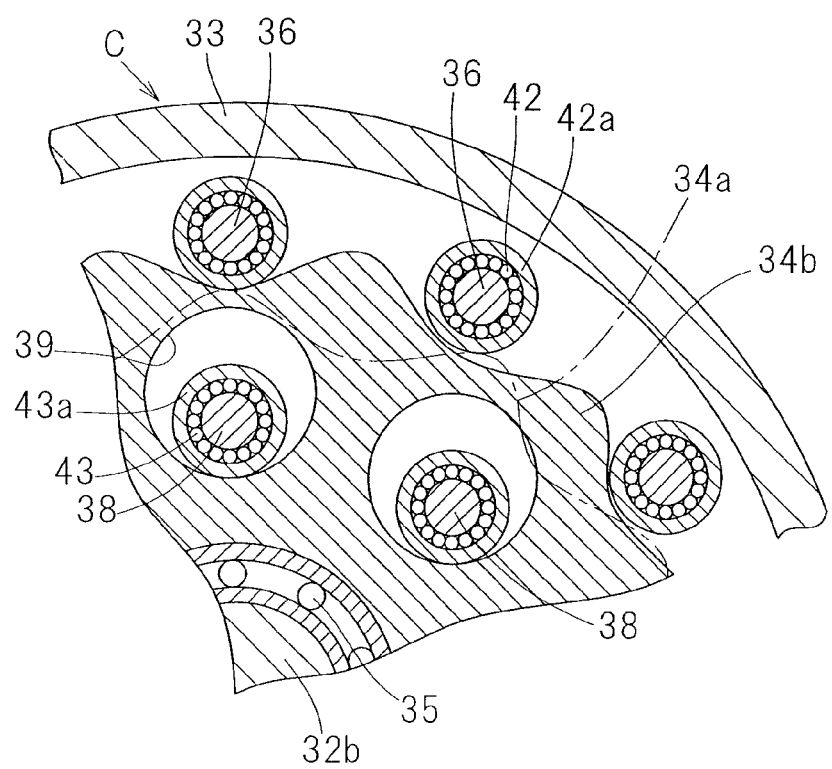
FIG. 4 is a sectional view showing a portion of FIG. 3 on an enlarged scale.

Referring to FIG. 4, bearings 42 are mounted on the outer pins 36, respectively, each having an outer ring 42a, and bearings 43 are mounted on the inner pins 38, respectively, each having an outer ring 43a. The outer rings 42a of the bearings 42 revolve around the outer peripheries of the curved plates 34a and 34b in contact therewith while the outer rings 43a of the bearings 43 revolve around inner peripheries of the throughholes 39, respectively, in contact therewith. Accordingly, it is possible to smoothly transmit the eccentric motions of the curved plates 34a and 34b to the inner member 2 as a rotary motion while the contact resistance, developed between each of the outer pins 36 and the outer periphery of each of the curved plates 34a and 34b, and the contact resistance, developed between each of the inner pins 38 and the inner periphery of each of the throughholes 39, are reduced.

Figure 5:
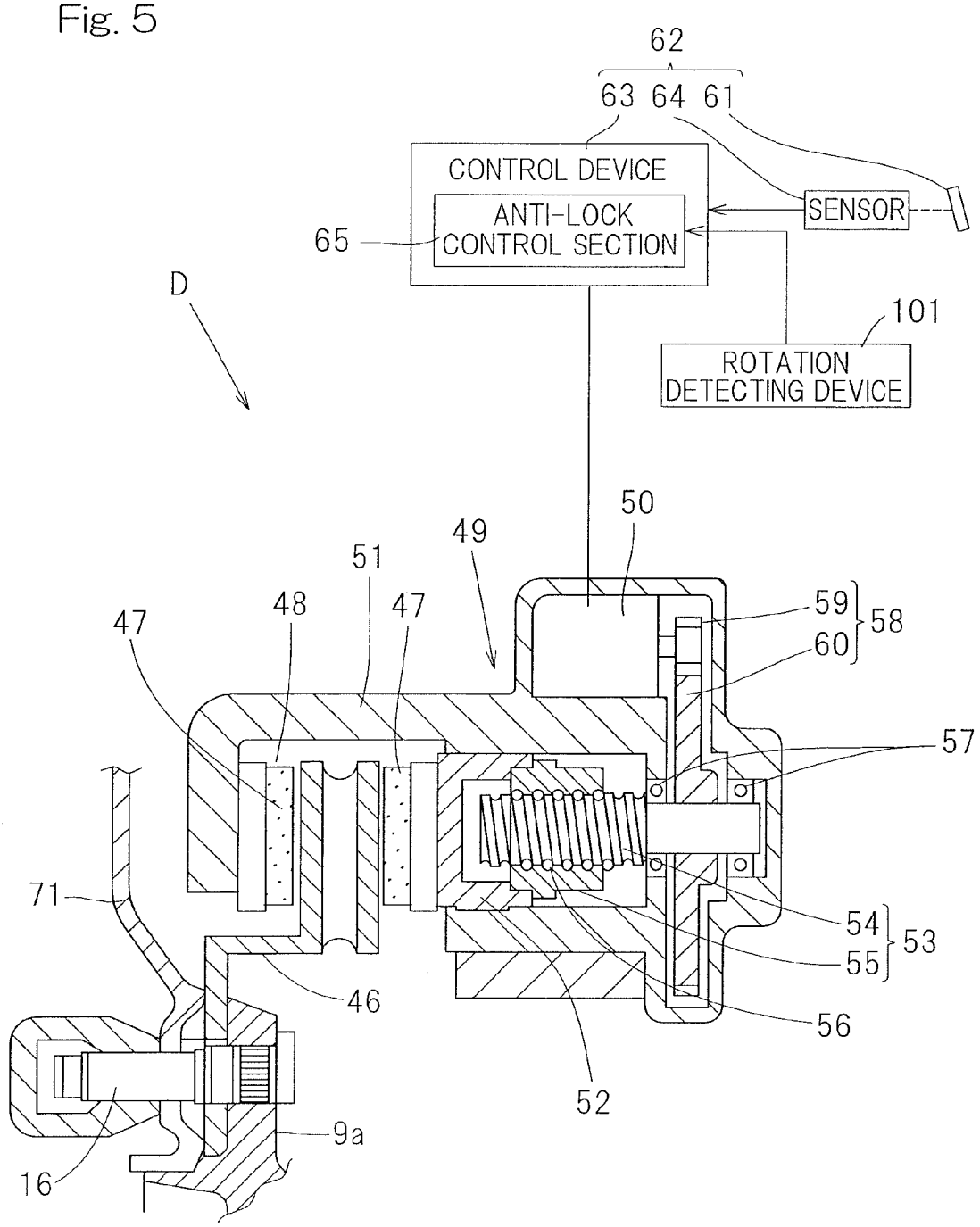
FIG. 5 is a sectional view showing a brake employed in the bearing device shown in FIG. 1.

As shown in FIG. 5, the brake D is an electrically powered brake of a kind which includes an actuating unit 48, comprised of the brake ring 46, which is fitted to the hub flange 9a together with the vehicle drive wheel 70 shown in FIG. 1, and brake pads 47 frictionally engageable with the brake ring 46, and a drive unit 49 for actuating the brake pads 47. The brake D also utilizes a brake dedicated electric motor 50 with the drive unit 49 serving as a drive source therefor. The brake ring 46 is comprised of a brake disc. The brake pads 47 are provided in a pair so as to sandwich the brake ring 46. One of the brake pads 47 is fixed to a brake frame 51 and the other of the brake pads 47 is fitted to a selective advancing and retracting member 52 linearly reciprocatingly movably installed on the brake frame 51. The direction of selective advance and retraction of the selective advancing and retracting member 52 lies in a direction confronting the brake ring 46. This selective advancing and retracting member 52 is refrained from rotating relative to the brake frame 51.

The drive unit 49 includes the previously described brake dedicated electric motor 50 and a ball screw mechanism 53 for translating the rotary output of the electric motor 50 into a linear reciprocating motion, which is in turn transmitted to the brake pad 47 as a braking force, and the output of the electric motor 50 is transmitted to the ball screw mechanism 53 through a speed reducing and transmitting mechanism 58. The ball screw mechanism 53 includes a screw shaft 54 which is only rotatably supported by the brake frame 51 through bearings 57, and a nut 55 which is fixed on the selective advancing and retracting member 52. It is to be noted that the selective advancing and retracting member 52 and the nut 55 may be of one piece construction, in which the both are integrally formed with each other.

The ball screw mechanism 53 includes the screw shaft 54 and the nut 55, and a plurality of balls 56 interposed between screw grooves which are formed so as to confront an outer peripheral surface of the screw shaft 54 and an inner peripheral surface of the nut 55. The nut 55 includes a circulating unit (not shown) for recirculating the balls 56, interposed between the screw shaft 54 and the nut 55, along an endless path. The circulating unit may be of either an external circulating type, which utilizes a return tube or a guide plate, or an internal circulating type, which utilizes an end cap or bridges. Also, because this ball screw mechanism 53 is used to reciprocally move over a small distance, the ball screw mechanism 53 may be a type with no circulating unit employed, for example, a retainer type in which the plurality of balls 56 between the screw shaft 54 and the nut 55 are retained by a retainer (not shown).

The speed reducing and transmitting mechanism 58 referred to above is a mechanism for reducing in speed and transmitting the rotation of the brake dedicated electric motor 50 to the screw shaft 54 of the ball screw mechanism 53 and is made up of a gear train. This speed reducing and transmitting mechanism 58 employed in the practice of the embodiment now under discussion includes a gear 59 provided on an output shaft of the electric motor 50, and a gear 60 provided on the screw shaft 54 and meshed with the gear 59. The speed reducing and transmitting mechanism 58, other than that described above, may be of a type made up of, for example, a worm and a worm wheel (both not shown).

The brake D referred to above also includes an operating unit 62 for controlling the electric motor 50 in accordance with the operation of an operating member 61 such as, for example, a brake pedal. This operating unit 62 is provided with an anti-lock control section 65 and is comprised of the operating member 61 referred to above, a sensor 64 capable of detecting the amount of operation of and the operating direction of the operating member 61, and a control device 63 for controlling the electric motor 50 in response to a detection signal of the sensor 64. The anti-lock control section 65 referred to above is provided in this control device 63. The control device 63 also includes a section of generating a motor control signal and a motor drive circuit (both not shown) capable of controlling a motor current in response to the generated motor control signal.

The anti-lock control section 65 is a means for avoiding a rotation lock of the vehicle drive wheel 70, when a breaking force is applied through the operating member 61, by adjusting a braking force delivered from the electric motor 50 in accordance with the rotation of the vehicle drive wheel 70. The anti-lock control section 65 detects the rotational velocity of the vehicle drive wheel 70 during the above described braking and performs a process of adjusting the braking force, that is, a fastening force of the brake pad 47 by, for example, lowering a driving current of the electric motor 50 or temporarily generating a reverse rotation output when the rotation lock or the incipience thereof is detected from the detected velocity. For the detection of the rotational velocity of the vehicle drive wheel 70, an output of a rotation detecting device 101 as will be detailed later is utilized.

As best shown in FIG. 1, the vehicle drive wheel 70 referred to above is fitted to the hub flange 9a of the wheel support bearing assembly A together with the above described brake ring 46. The vehicle drive wheel 70 is of a type provided with a tire 72 around a wheel 71. In a condition with the brake ring 46 sandwiched between the hub flange 9a and the wheel 71, the hub bolt 16 press fitted into the press fitting hole 17 is threaded to the wheel 71 to thereby fix the wheel 71 and the brake ring 46 to the hub flange 9a.

Figure 6:
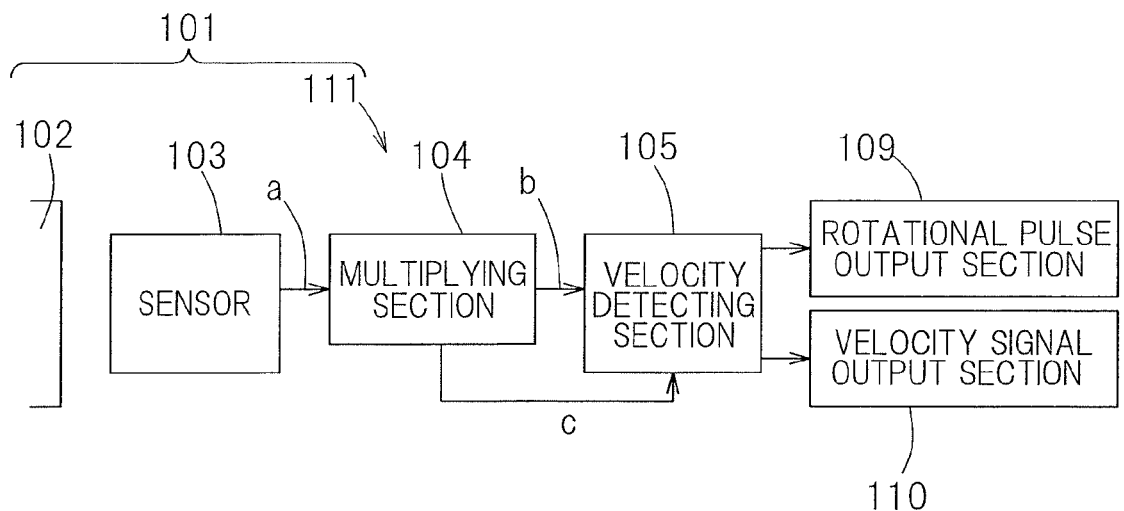
FIG. 6 is a block diagram showing a schematic structure of a rotation detecting device employed in bearing device shown in FIG. 1.

FIG. 6 illustrates a block diagram showing a schematic structure of the rotation detecting device 101 referred to previously. This rotation detecting device 101 includes a ring shaped encoder 102 having a plurality of to-be-detected poles arranged equidistantly in a circumferential direction, a sensor 103 for detecting the to-be-detected poles of the encoder 102 to generate pulses a, a multiplying section 104 for generating a multiplied pulse b by multiplying the pulse a, generated by the sensor 103, by a preset multiplication factor N, and a velocity detecting section 105 for detecting the rotational velocity of the encoder 102 on the basis of the multiplied pulse b generated from the multiplying section 104.

The encoder 102 is disposed at a position between the plural rows of the rolling surfaces 4 and 4 on the outer peripheral surface of the inner member 2 of the wheel support bearing assembly A, best shown in FIG. 2, in a mounted fashion coaxial relative to the axis of the inner member 2. In the practice of the embodiment now under discussion, the sensor 103 is provided on the side of the outer member 1 of the wheel support bearing assembly A so as to confront the encoder 102 in a radial direction through a minute gap.

Figure 7A:
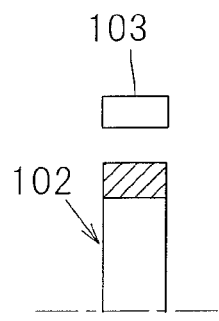
FIG. 7A is a sectional view showing a half part of an encoder employed in the rotation detecting device shown in FIG. 6.
Figure 7B:
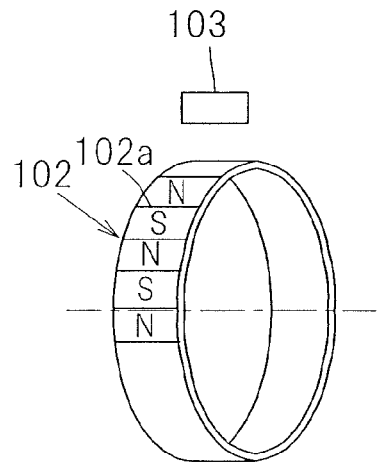
FIG. 7B is a perspective view of the encoder shown in FIG. 7A.

In the example as shown in FIG. 2, in which the encoder 102 is of a radial type, as shown in FIGS. 7A and 7B showing respectively a half sectional view and a perspective view, the encoder 102 is in the form of a ring shaped magnetic encoder having its peripheral surface magnetized with a plurality of circumferentially equidistantly spaced magnetic pole pairs (pairs of magnetic poles N and S) 102a as the to-be-detected poles. In the case of FIG. 2, the encoder 102 is constituted by a core metal 120 having its outer periphery provided with a multipolar magnet 121 such as, for example, a plastic magnet or a rubber magnet.

Figure 8A:
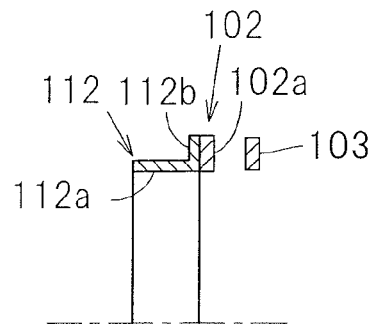
FIG. 8A is a sectional view showing a half part a modified encoder employed in the rotation detecting device shown in FIG. 6.
Figure 8B:
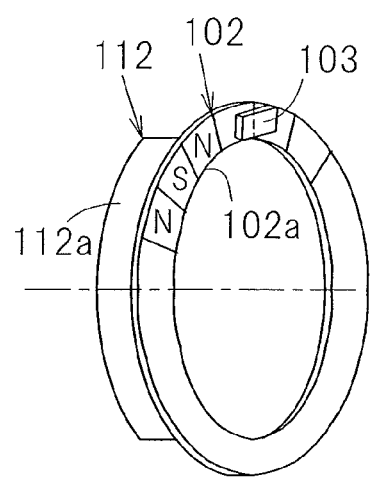
FIG. 8B is a perspective view of the modified encoder shown in FIG. 8A.
Figure 9:
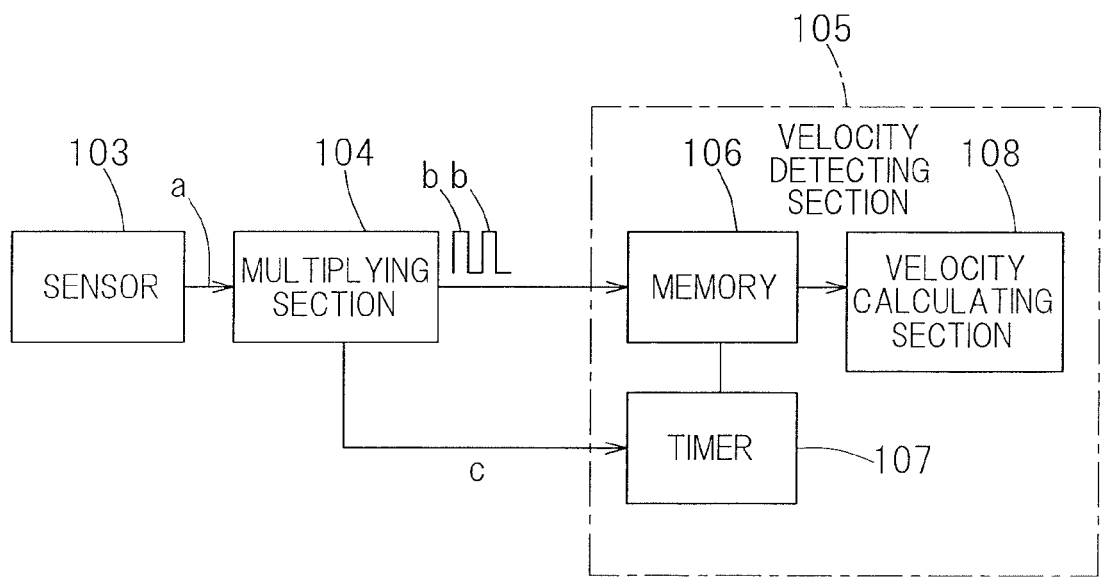
FIG. 9 is a block diagram showing a velocity detecting section employed in the rotation detecting device shown in FIG. 6.

Although the encoder 102 so constructed as shown in and described with reference to FIGS. 7A and 7B is the radial type, in which the magnetic pole pairs 102a have been magnetized to the peripheral surface, the encoder 102 may be of an axial type as shown in FIGS. 8A and 8B in a half sectional view and a perspective view, respectively. In the example of structure shown in FIGS. 8A and 8B, the plural magnetic pole pairs 102a are equidistantly arranged and magnetized in the circumferential direction of a side face of a flanged portion 112b extending radially outwardly from one end of a cylindrical portion 112a of a ring shaped core metal 112 of, for example, an L-sectioned shape. In this case, the sensor 103 is disposed having been oriented in the axial direction so that it can confront a magnetized surface of the encoder 102. It is to be noted that the sensor 103 and the multiplying section 104 may be comprised of a plurality of aligned magnetic detecting elements (not shown) and may have a capability of generating outputs of a predetermined multiplication number on the basis of an internal signal generated by calculating an output of those plural magnetic detecting elements.

A structural portion of the rotation detecting device 101 except for the encoder 102 is integrally formed as a sensor side unit 111. The sensor side unit 111 is, in the case of the example shown in FIG. 2, fitted to the outer member 1 of the wheel support bearing assembly A by inserting it into a sensor mounting hole 87. The sensor side unit 111 is formed in the outer member 1 of the wheel support bearing assembly A so as to extend radially between the rolling elements 5 and 5, and the sensor 103 disposed at a tip of the unit 111 is held in fact to face relation with the above described encoder 102 in a radial direction through a gap. The sensor mounting hole 87 is in the form of, for example, a throughhole having, for example, a round sectional shape. Between an inner peripheral surface of the sensor mounting hole 87 and the sensor side unit 111 is fixedly sealed by means of, for example, a contact seal such as an O-ring, a bonding agent or a screw.

The sensor side unit 111 of the rotation detecting device 101 has a shaft shaped inserting portion 111a of an outer diameter substantially in the sensor mounting hole 87 and a head portion 111b, which is not inserted in the sensor mounting hole 87. The head portion 111b is disposed in contact with the outer peripheral surface of the outer member 1. An output cable 122 is drawn outwardly from the head portion 111b. As best shown in FIG. 1, this output cable 122 is bundled together with an output cable 100 of the electric drive motor B and any other cables, not shown, to provide a single bundled output cable, which is in turn drawn outwardly from one location. Accordingly, wiring of the output cables 100 and 122 can be facilitated and the reliability increases accordingly.

The velocity detecting section 105 referred to previously is operable, each time the multiplying section 104 generates a multiplied pulse b, to sequentially detect the average rotational velocity of the encoder 102 during the interval in the past, in which the latest N pieces of the multiplied pulses b have been generated. The number N represents the multiplication factor by which the pulses generated in the past have been multiplied. In this case, the velocity detecting section 105 performs the detection of the rotational velocity with the use of a multiplying information c outputted from the multiplying section 104. The multiplying information c referred to above means information representative of the status of operation of the multiplying section 104, which the velocity detecting section 105 requires in the calculation, such as the status of the preset multiplication factor. The velocity detecting section 105 is made up of, as specifically shown in FIG. 9, a pulse generating time storage section (memory) 106, a timer 107 and a velocity calculating section 108.

Figure 10:
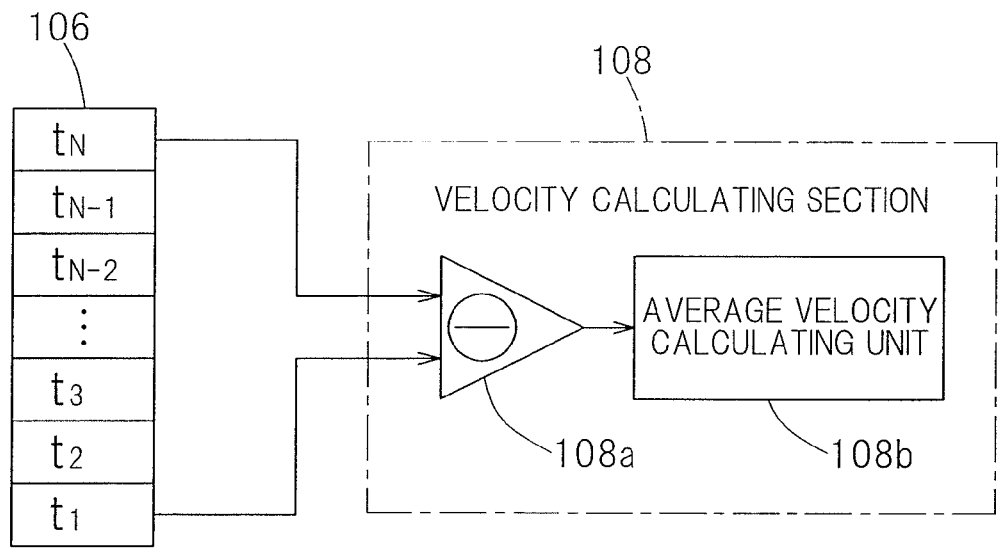
FIG. 10 is a block diagram showing a pulse generating timing storage section and a velocity calculating section, both employed in the velocity detecting section shown in FIG. 9.

The pulse generating time storage section 106 has a storage area for storing therein generating times of the respective N pieces of the multiplied pulses b, where N represents the previously described multiplication factor N. One example of structure of the storage area of the pulse generating time storage section 106 referred to above is shown in FIG. 10. Referring to FIG. 10, timing $t_1$, $t_2$, ... $t_{N-1}$ and $t_N$ represent respective generating times of a number N of the multiplied pulses b. The pulse generating time storage section 106 is a storage section such as a queue capable of storing the respective times of the latest N pieces of the multiplied pulses, where the number N represents the multiplication factor N, in a first in first out fashion. In order that the oldest storage content is erased, the storage contents are sequentially shifted to the subsequent storage areas in the storage area queue while the latest timing is inputted to the head of the storage area queue then emptied. The timer 107 counts the generating time (more specifically, the timing at which the multiplied pulse sets up) each time a multiplied pulse b is generated, to thereby cause the pulse generating time storage section 106 to store it. Accordingly, as hereinabove described, the pulse generating time storage section 106 is updated so that it can contain the generating times of the latest N pieces of the multiplied pulses b, where N represents the multiplication factor N.

It is to be noted that the term "timer 107" referred to hereinbefore and hereinafter is intended to means a time counting portion and input processing section including a counting portion having a primary timer function and an input processing portion by which the time counted by the time counting portion is inputted to the pulse generating time storage section 106.

In the velocity calculating section 108, when the current multiplied pulse is stored in the pulse generating time storage section 106, as shown in FIG. 10, the difference between the generating time of the current multiplied pulse b and the generating time of the N-th latest multiplied pulse b stored in the pulse generating time storage section 106 is calculated by a difference calculating unit 108a and, using this difference, the average rotational velocity referred to previously is calculated by an average velocity calculating unit 108b.

Figure 11:
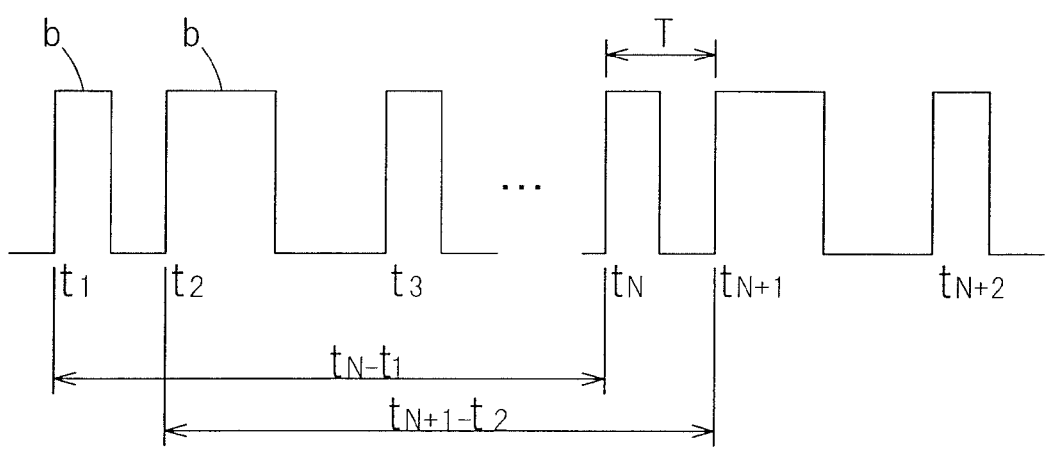
FIG. 11 is an explanatory diagram showing the operation of a differential calculating unit employed in the velocity calculating section shown in FIG. 10.

By way of example, referring to FIG. 11 showing an output waveform of the multiplied pulse b that is continuously generated, when the generating time $t_N$ of the current multiplied pulse b is stored in the pulse generating time storage section 106 shown in FIG. 10, in the velocity calculating section 108 the difference between the generating time $t_N$ and the generating time $t_1$ of the N-th latest multiplied pulses b, where N represents the multiplication factor, that is, $t_N - t_1$ is calculated by the difference calculating unit 108a. By using this difference, the average rotational velocity (angular velocity) v is calculated in the average velocity calculating unit 108b as available from the equation of $[v=\Delta\theta/(t_N-t_1)]$. Where the parameter $\Delta\theta$ represents the central angle corresponding to each magnetic pole pair 102a of the magnetic encoder 102 referred to previously. In other words, assuming that the number of the magnetic pole pairs 102a (FIGS. 7A and 7B and FIGS. 8A and 8B) of the magnetic encoder 102 is m, the parameter $\Delta\theta$ is a value determined by the following equation:

$$\Delta\theta = 360°/m$$

Similarly, when the generating time $t_{N+1}$ of the subsequent multiplied pulse b is stored in the pulse generating time storage section 106, in the velocity calculating section 108 the difference between the generating time $t_{N+1}$ and the generating time $t_2$ of the N-th latest multiplied pulse, where N represents the multiplication factor N, is calculated in the difference calculating unit 108a. Then, the average rotational velocity v is calculated in the average velocity calculating unit 108b as available from the equation of $[v=\Delta\theta/(t_{N+1}-t_2)]$.

In the multiplied pulse b generated by the multiplying section 104 there is such a pitch error as shown in FIG. 11, but an error pattern has such a characteristic as a reproducibility of being repeated for each of the magnetic pole pairs 102a of the encoder 102. Accordingly, as described hereinabove, if the central angle is detected by, for example, dividing the central angle $\Delta\theta$ of the magnetic pole pair 102a by the interval (for example, $t_N-t_1$) of N multiplied pulses b generated by multiplying the pulse a detected by the sensor 103, variations resulting from the pitch error are averaged and, as shown by the symbol A in FIG. 12, an error in detecting velocity can be minimized. Moreover, the velocity is detected in synchronism with generation of the multiplied pulse b and, therefore, the detecting resolution can be increased.

Figure 12:
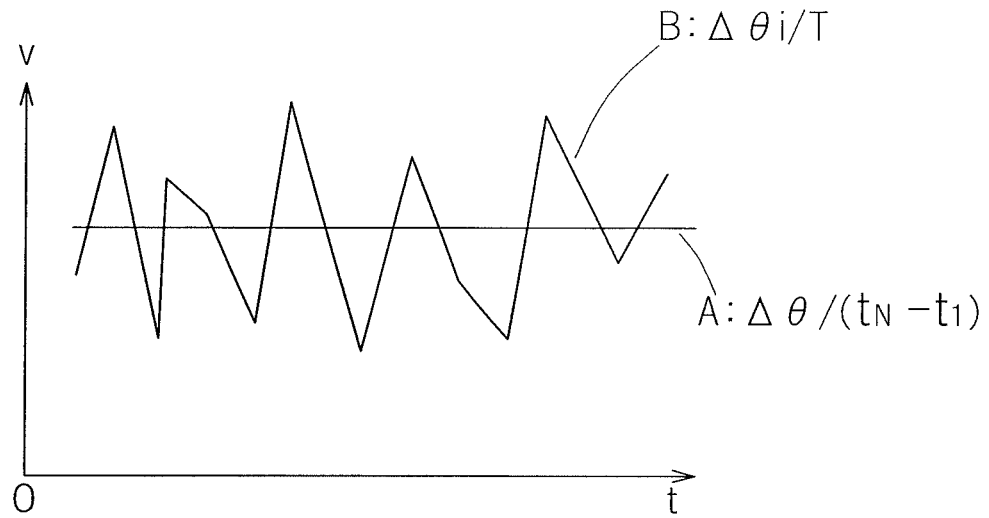
FIG. 12 is a chart showing a change in velocity, obtained from the velocity calculating section, shown in comparison with a change in velocity obtained by the conventional method.

In contrast thereto, where the velocity v is calculated as $[v=\Delta\theta i/T]$ from the central angle $\Delta\theta i$ corresponding to a pulse pitch of a multiplied pulse b, shown in FIG. 11, and the time interval T of the pulse pitch, a change in error of the detected velocity is considerable as shown by the symbol B in FIG. 12.

Also, in the rotation detecting device 101 employed in the practice of this embodiment now under discussion includes, as shown in FIG. 6, a rotation pulse output section 109 for outputting the multiplied pulse, generated by the multiplying section 104, as a rotation pulse, and a velocity signal output section 110 for outputting the average rotational velocity, detected by the velocity detecting section 105, as a velocity signal. The velocity signal from the velocity signal output section 110 is outputted in unison with the outputting of the rotation pulse output section 109. Since both of the rotation pulse and the velocity signal are outputted, a processing circuit in the sensor equipped and in-wheel motor incorporated wheel support bearing device having the rotation detecting device 101 incorporated therein can be omitted or simplified, thus accomplishing compactization.

In the construction shown in and described with reference to FIG. 6, the sensor 103, the multiplying section 104 and the velocity detecting section 105 may be integrated together by providing them on either a common sensor chip or a common substrate. If so constructed, the rotation pulse and the velocity signal are outputted from one sensor chip or substrate and, therefore, the rotation detecting device 101 can be compactized and the signal processing circuit can be omitted.

Figure 13:
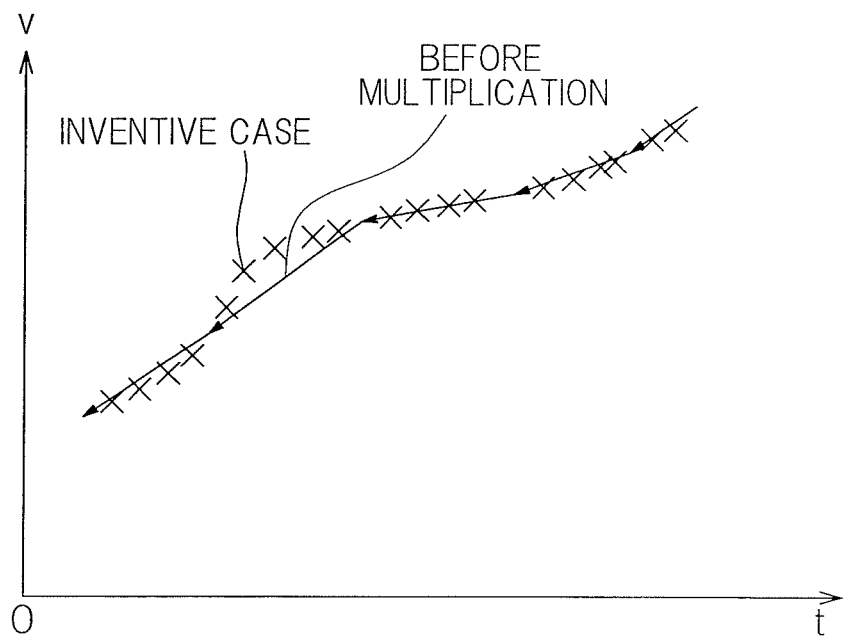
FIG. 13 is a chart showing plots of detected velocities, obtained by the use of complete multiplied pulses, shown in comparison with plots of detected velocities obtained with no multiplied pulse being used.

Since as hereinabove described, in the rotation detecting device 101, all of the multiplied pulses b, that is, the pulses a detected by the sensor 103 and multiplied, are used to perform the velocity detection, the rate of velocity detection, that is, the sampling number of the velocity detection can be increased as marked by x markings in the chart of FIG. 13 and the control response can be enhanced in the control of the electric motor 50 by the anti-lock control section 65 (shown in FIG. 5) utilizing the detected velocity v and the control of the electric drive motor B of the sensor equipped and in-wheel motor incorporated wheel support bearing device. Also, a detailed change in velocity can be detected highly accurately. It is to be noted that blackened triangles represent the change in detected velocity v appearing when the velocity detection is performed with no multiplied pulse b used, that is, when only the pulse a detected by the sensor 103 is used to perform the velocity detection.

The wheel support bearing device is fixed to the automotive vehicle (not shown) through a suspension device 73 fitted to an outer peripheral portion of the casing 22 for the electric drive motor B. The suspension device 73 is provided with an attenuating section 74 for attenuating a force, acting on the point of contact of the vehicle drive wheel 70 with the road surface and then transmitting it to the automotive vehicle. This attenuating section 74 may be in the form of, for example, a damper or a shock absorber and is of a type capable of being electrically operated to change the degree of attenuation.

The force acting at the point of contact between the vehicle drive wheel 70 and the ground surface is a composite of a force Fx acting in a direction parallel to the direction of travel, a force Fy acting in a direction parallel to the axis of the vehicle drive wheel and a force Fz acting in the vertical direction, all of those forces acting in respective directions perpendicular to each other. The wheel support bearing device is provided with respective sensors for individually detecting those forces acting in three axis directions. The force Fx acting in the direction parallel to the direction of travel can be determined from an output of a current sensor 80 for detecting an electric current value I of the electric drive motor B. The force Fy acting in the direction parallel to the axis of the vehicle drive wheel can be determined from an output of an axially acting strain sensor 81, best shown in FIG. 1, for detecting an axially acting strain $\epsilon y$ of the outer member 1, which is a stationary raceway ring of the wheel support bearing assembly A. The vertically acting force Fz can be determined from an output of a radially acting strain sensor 82, best shown in FIG. 1, for detecting a radially acting strain $\epsilon z$ of the outer member 1, which is the stationary raceway ring of the wheel support bearing assembly A.

Figure 14:
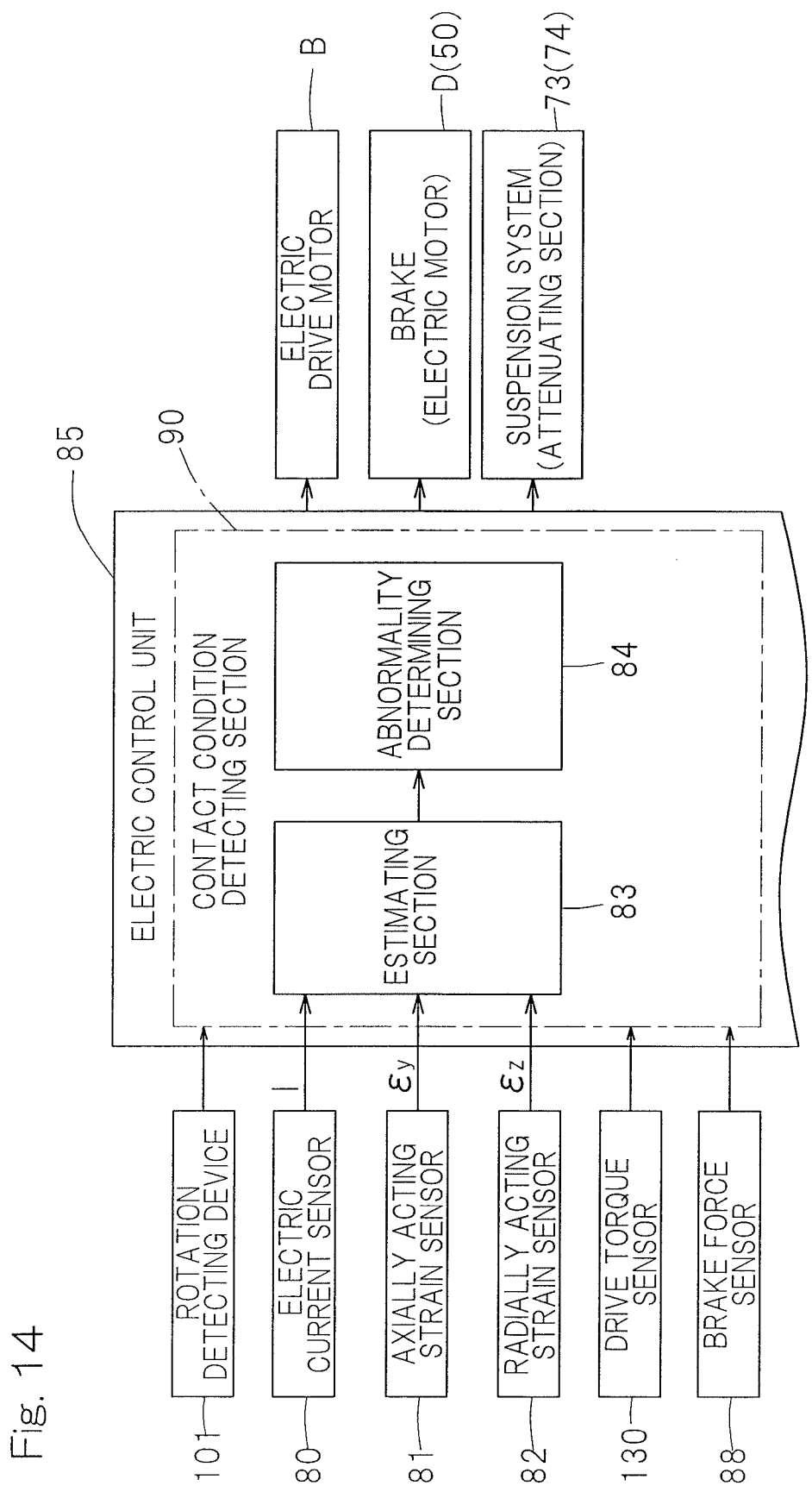
FIG. 14 is a block diagram showing a control system of the wheel support bearing device.

As shown in FIG. 14, the rotation detecting device 101 is connected with a contact condition detecting section 90. This contact condition detecting section 90 is a section for calculating a change in rotational velocity detected by the rotation detecting device 101 and then outputting information descriptive of a contact condition exhibited between the vehicle drive wheel 70 and the road surface, and is provided in, for example, an electric control unit (ECU) 85 of the automotive vehicle. The contact condition detecting section 90 includes a load estimating section 83 for processing the respective outputs of the sensors 80, 81 and 82 and an abnormality determining section 84. The load estimating section 83 estimates a force, acting on the point of contact of the vehicle drive wheel 70 from the respective outputs of the sensors 80, 81 and 82. The contact condition detecting section 90 may be of a type incorporated in an electronic circuit device (not shown) such as a circuit substrate provided for each of the wheel support bearing device. The electric drive motor B, the electric motor 50 for the brake D and the attenuating section 74 for the suspension device 73 are connected with an output side of the electric control unit 85.

The contact condition detecting section 90 is also connected with, in addition to the rotation detecting device 101, a torque sensor 130 for detecting a drive torque of the electric drive motor B and a braking force sensor 88 for detecting a brake force, that is, a braking force exerted by the brake D. The contact condition detecting section 90 is so configured that the information descriptive of the contact condition can be outputted by the use of, in addition to the change in rotational velocity, respective estimated values or measured values of the drive torque of the electric drive motor B and the brake force.

Since the amount of the electric current flowing through the electric drive motor B differs depending on the magnitude of the action force in the direction of travel, acting on the point of contact between the vehicle drive wheel 70 and the road surface, the magnitude of the above described action force can be calculated if a relation between the action force and the amount of the electric current has been determined by means of a series of experiments and/or simulations. The load estimating section 83 referred to above is operable to calculate the traveling direction force, then acting on the point of contact between the vehicle drive wheel and the road surface, from the output of the current sensor 80 in reference to the relation between the action force and the amount of the electric current, which has been determined by the experiments and/or simulations as described above.

Also, since the axially acting strain of the outer member 1, which is the stationary raceway ring, differs depending on the magnitude of the action force in the axial direction, acting on the point of contact between the vehicle drive wheel 70 and the road surface, the magnitude of the above described action force can be calculated if a relation between the action force and the axially acting strain has been determined by means of a series of experiments and/or simulations. The load estimating section 83 referred to above is operable to calculate the axial direction force, then acting on the point of contact between the vehicle drive wheel and the road surface, from the output of the axially acting strain sensor 81 in reference to the relation between the action force and the axially acting strain, which has been determined by the experiments and/or simulations as described above.

Moreover, since a change in radially acting strain of the outer member, which is the stationary raceway ring, differs depending on the magnitude of the action force in the vertical direction, acting on the point of contact between the vehicle drive wheel 70 and the road surface, the magnitude of the above described action force can be calculated if a relation between the action force and the radially acting strain has been determined by means of a series of experiments and/or simulations. The load estimating section 83 referred to above is operable to calculate the vertical direction force, then acting on the point of contact between the vehicle drive wheel and the road surface, from the output of the radially acting strain sensor 82 in reference to the relation between the action force and the radially strain, which has been determined by the experiments and/or simulations as described above.

Since as hereinabove described, the contact condition detecting section 90 is so configured as to calculate the change in rotational velocity of the vehicle drive wheel 70 and then to output the information descriptive of a condition of the road surface and/or the contact condition between the vehicle drive wheel 70 and the road surface, the condition of the road surface and/or the contact condition can be estimated further accurately. When the various information so obtained is utilized in controlling the electric drive motor B and in controlling the attitude of the automotive vehicle, the safety factor and the economical efficiency can be increased. By way of example, in order to facilitate a smooth turn of the automotive vehicle, the information referred to above is outputted to the electric drive motor B to control the rotational velocity of the vehicle drive wheel 70. In order to avoid an occurrence of the vehicle drive wheel 70 being locked during the braking, the previously described information is outputted to the electric motor 50 for the brake D to thereby control the braking. In order to avoid the tilt of the automotive vehicle largely leftwards or rightwards during the cornering and also to prevent the automotive vehicle from pitching forwards or rearwards during the acceleration or the braking, the above described information is outputted to the attenuating section 74 for the suspension device 73 to control the suspension device. The abnormality determining section 84 outputs an abnormality signal in the event that the action force acting in the previously described three axis direction exceeds a tolerance. Even this abnormality signal can be used in vehicle control of the automotive vehicle. In addition, if the action force acting between the vehicle drive wheel 70 and the road surface is outputted on a real time basis, the further meticulous attitude control is possible.

Furthermore, since the contact condition detecting section 90 is so configured that information descriptive of the contact condition can be outputted, in addition to the change in rotational velocity of the vehicle drive wheel 70, with the use of the estimated or calculated value of the drive torque of the electric drive motor B and the brake force acting in the brake D, it is possible to determine the drive condition under which the change in rotational velocity so obtained is generated. Accordingly, it is possible to increase the accuracy of estimation of the condition of the road surface and the contact condition. By way of example, the use of a mapping method changing section for changing calculation parameters, used in the load estimating section 83, in dependence on the magnitude of the drive torque makes it possible to estimate the load further accurately.

Figure 15:
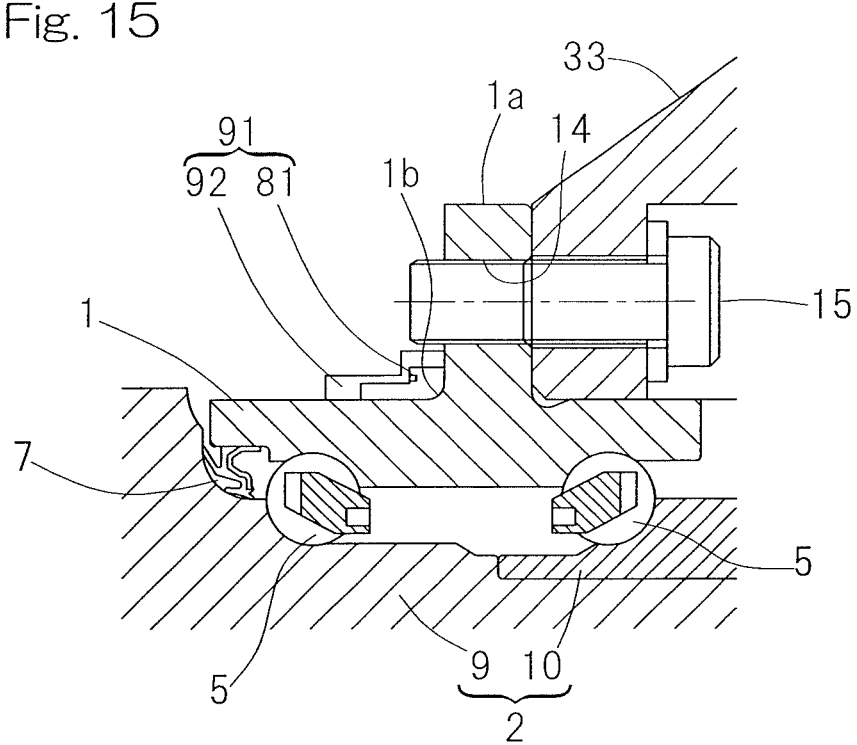
FIG. 15 is a sectional view showing, on an enlarged scale, a sensor mounting portion of the bearing device shown in FIG. 1, where an axially acting strain sensor of the wheel support bearing device is mounted.
Figure 16:
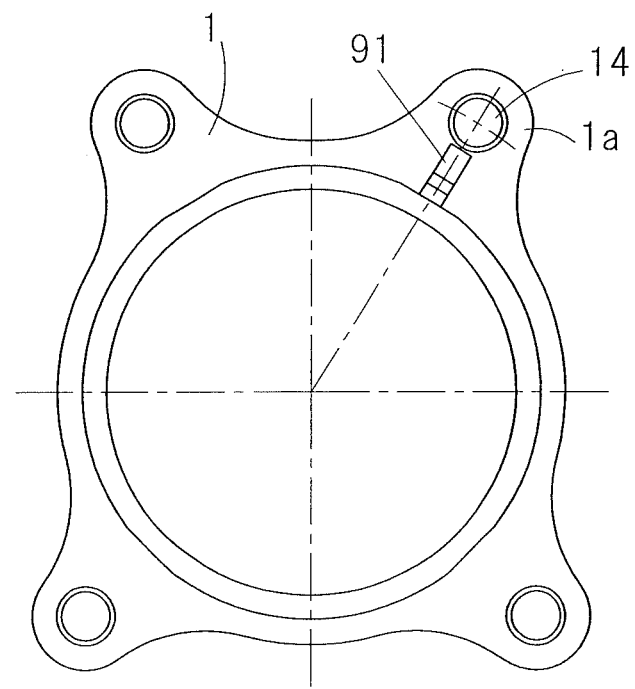
FIG. 16 is a front elevational view showing an outer member of the wheel support bearing device and a sensor unit for the axially acting strain sensor.
Figure 17A:
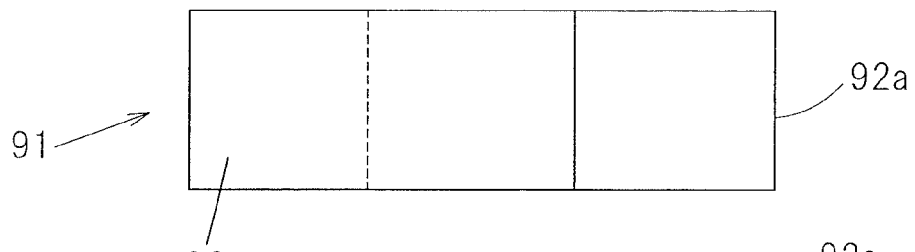
FIG. 17A is a top plan view of the sensor unit shown in FIG. 16.
Figure 17B:
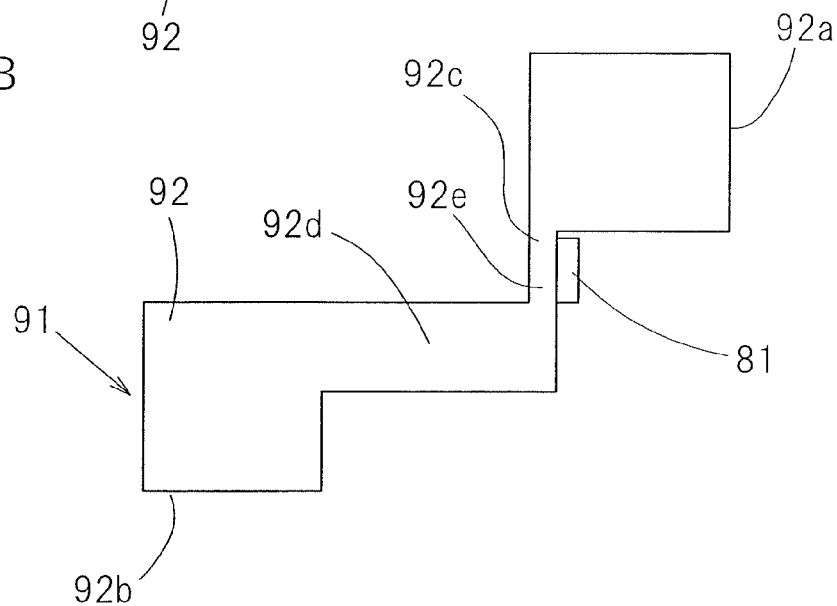
FIG. 17B is a side view of the sensor unit shown in FIG. 16.

The axially acting strain sensor 81 is installed in such a manner as shown in FIG. 15 to FIGS. 17A and 17B by way of example. Specifically, as shown in FIGS. 15 and 16, the axially acting strain sensor 81 is fitted to a sensor mounting member 92 to provide a sensor unit 91, which is in turn fixed to an outer peripheral portion of the outer member 1 of the wheel support bearing assembly A. The sensor mounting member 92 includes, as shown in FIGS. 17A and 17B, a first contact fixing segment 92a, adapted to be fixed in the vicinity of the bolt insertion hole 14 in the outer member 1 in contact therewith and a second contact fixing segment 92b adapted to be fixed to the outer peripheral surface of the outer member 1 in contact therewith. The sensor mounting member 92 is of an L-sectioned shape configuration defined by a radial area 92c extending in an radial direction, containing the first contact fixing segment 92a, and an axial area 92d extending in an axial direction, containing the second contact fixing segment 92b. The radial area 92c has a wall thickness reduced to provide a rigidity lower than that of the axial area 92d. The axially acting strain sensor 81 is fitted to the radial area 92c where the rigidity is relatively low.

The sensor unit 91 referred to above is fixed to the outer peripheral portion of the outer member 1 by means of the first and second contact fixing segments 92a and 92b of the sensor mounting member 92 so that the first and second contact fixing segments 92a and 92b may assume respective positions that lie in the same phase in a circumferential direction of the outer member 1. If the first and second contact fixing segments 92a and 92b are held in the same phase in the circumferential direction of the outer member 1, the sensor mounting member 92 can have a reduced length and, therefore, installation of the sensor unit 91 can be facilitated. The axially acting strain sensor 81 is fixed to the sensor mounting member 92 by the use of, for example, a bonding agent.

The shape of and material for the sensor mounting member 92 are so chosen that when the sensor mounting member 92 is fixed to the outer member 1, no plastic deformation occurs in that sensor mounting member 92. Also, the sensor mounting member 92 is required to have such a shape that no plastic deformation occurs even when the maximum expected load is applied to the wheel support bearing assembly A. The maximum expected force referred to above is the maximum force expected to occur during the travel which will not lead to a trouble in the automotive vehicle. Once the plastic deformation occurs in the sensor mounting member 92, the deformation of the outer member 1 will not be accurately transmitted to the sensor mounting member 92 and the strain measurement will be adversely affected.

The sensor mounting member 92 can be prepared by means of, for example, a press work. If the sensor mounting member 92 is in the form of a press worked product, the cost can be reduced. The sensor mounting member 92 may be in the form of a sintered metal product formed by means of a powdery metal injection molding. The powdery metal injection molding is one of molding techniques used to make a metallic compound or an intermetallic compound and includes kneading the powdery metal with a binder, injecting the kneaded product to form a molded body, degreasing the molded body and sintering the molded body. According to this powdery metal injection molding, a sintered body having a high sintering density as compared with the standard powdery metallurgy can be obtained and, hence, there are advantages that the sintered metal product can be manufactured with a high dimensional accuracy and the mechanical strength is high.

For the axially acting strain sensor 81, any of various types can be employed. For example, where the axially acting strain sensor 81 is prepared in the form of a metal foil strain gauge, and considering the durability of a metal foil strain gauge, it is preferred that even when the maximum expected load is applied to the wheel support bearing the amount of strain in a mounting portion of the sensor mounting member 92, where the axially acting strain sensor 81 is fitted, may be equal to or lower than 1,500 microstrain. By the reasoning similar to that discussed above, where the axially acting strain sensor 81 is prepared in the form of a semiconductor strain gauge, the amount of the strain in the mounting portion is preferably equal to or lower than 1,000 microstrain. Also, where the axially acting strain sensor 81 is prepared in the form of a thick film sensor, the amount of the strain in the mounting portion is preferably equal to or lower than 1,500 microstrain.

Since the structure is employed in which the sensor unit 91, made up of the sensor mounting member 92 and the axially acting strain sensor 81 fitted to such sensor mounting member 92, is fitted to the outer member 1, the sensor for detecting the axially acting load can be compactized. Since the sensor mounting member 92 is a simple component part that is fitted to the outer member 1, mounting of the axially acting strain sensor 81 on this sensor mounting member 92 makes it possible to enhance the mass productivity and reduction in cost.

When the load is applied to the inner member 2, which is a hub for the vehicle drive wheel 70, by the effect of the axially acting force acting on the point of contact between the vehicle drive wheel 70 and the road surface, the outer member 1 deforms through the rolling elements 5 and such deformation is transmitted to the sensor mounting member 92 secured to the outer member 1, resulting in deformation of the sensor mounting member 92. The strain occurring in the sensor mounting member 92 is measured by the axially acting strain sensor 81. At this time, the radial area 92c of the sensor mounting member 92 deforms in dependence on deformation of the flange 1a of the outer member 1. In the case of this embodiment now under discussion, since the rigidity of the radial area 92c is low as compared with that of the outer member 1 and since the sensor mounting member 91 is L-shaped with the radial area 92c of a low rigidity and the axial area 92d of a high rigidity, the strain tends to concentrate in the vicinity of a corner 92e on the side of the radial area 92c which is between the radial area 92c and the axial area 92d and thus appears as a strain of a larger magnitude than the outer member 1. In other words, the strain generated between the radial area 92c and the axial area 92d corresponds to the strain in an R portion 1b at a base end of the flange 1a, which has been transcribed and amplified. This strain in the outer member 1 can be detected by the axially acting strain sensor 81 with a high sensitivity and the strain measuring accuracy increases accordingly. Also, since using the axially acting strain measured in this way with high accuracy, the action force in the axial direction, acting at the point of contact between the vehicle drive wheel 70 and the road surface is calculated, the calculated axial action force too is highly accurate.

Figure 18:
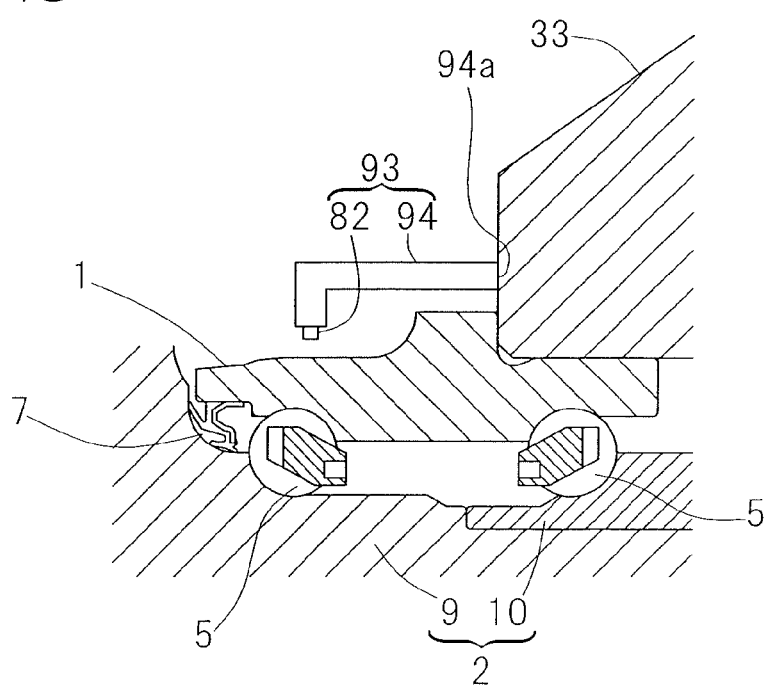
FIG. 18 is a sectional view showing, on an enlarged scale, of a sensor mounting portion of the bearing device shown in FIG. 1, where a radially acting strain sensor of the wheel support bearing device is mounted.
Figure 19:
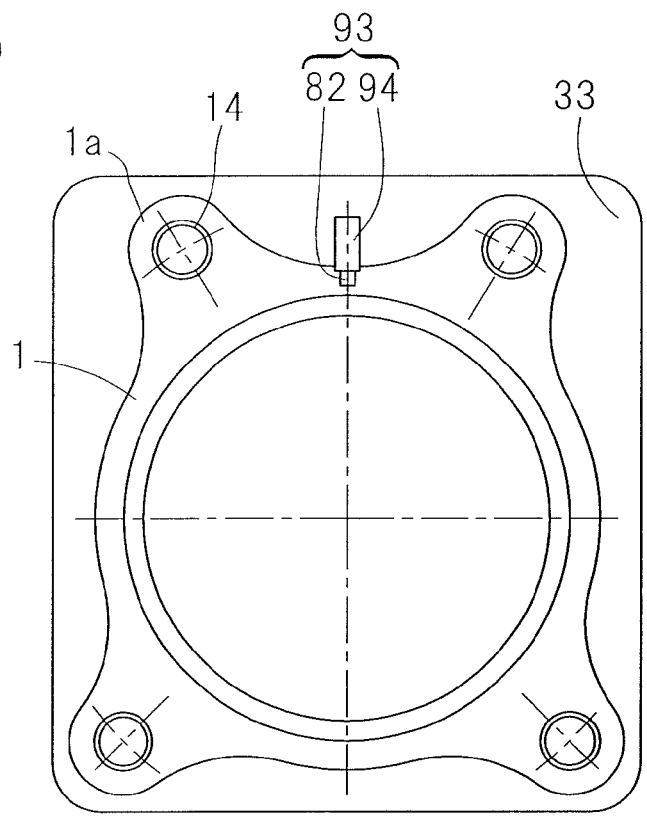
FIG. 19 is a front elevational view showing an outer member of the wheel support bearing device and a sensor unit for the radially acting strain sensor.
Figure 20A:
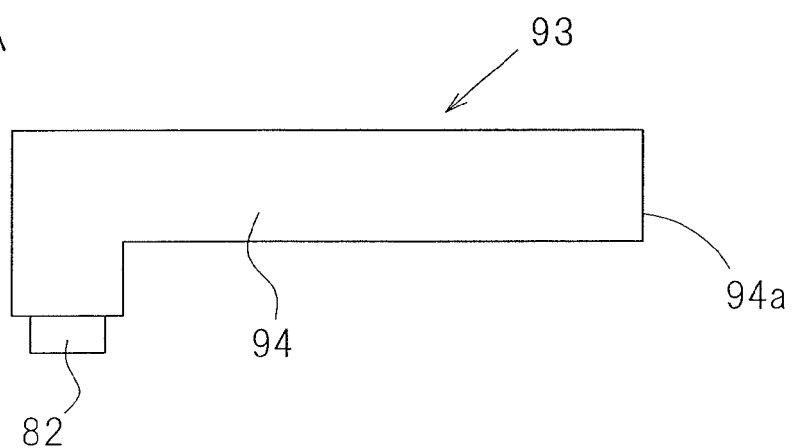
FIG. 20A is a top plan view of the sensor unit shown in FIG. 19.
Figure 20B:
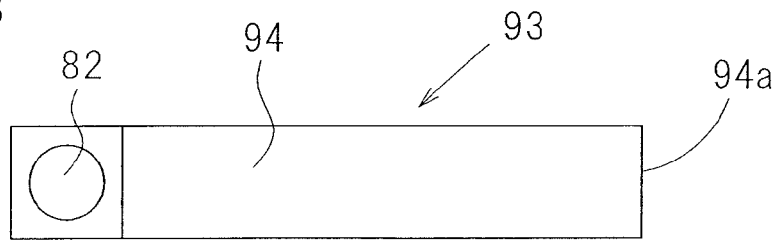
FIG. 20B is a bottom plan view of the sensor unit shown in FIG. 19.

The radially acting strain sensor 82 is installed in such a manner as shown in, FIG. 18 to FIGS. 20A and 20B by way of example. Specifically, as shown in FIGS. 18 and 19, the radially acting strain sensor 82 is fitted to a sensor mounting member 94 to form a sensor unit 93, which is in turn fixed to an outboard side face of the casing 33 for the speed reducing mechanism C shown in and described with reference to FIG. 1. As shown in FIGS. 20A and 20B, the sensor mounting member 94 is an elongated member having its tip bent to represent a hook-like shape, and the radially acting strain sensor 82 in the form of a displacement sensor is fitted to the tip of the sensor mounting member 94. A base of the sensor mounting member 94 is a contact fixing segment 94a that is secured to the casing 33.

The sensor unit 94 is fitted to the casing 33 when the contact fixing segment 94a of the sensor mounting member 94 is fixed to the outboard side face of the casing 33. In the case of this embodiment now under discussion, the radially acting strain sensor 82 is in the form of a displacement sensor of a non-contact type such as, for example, an eddy current type and is fitted to the sensor unit 93 in a fashion spaced a predetermined distance from the outer peripheral surface of the outer member so that an radial displacement occurring in a radial direction in the outer peripheral surface of the outer member 1 can be measured. The axial position of the outer member 1, at which the radially acting strain sensor 82 confronts, is chosen to be, for example, in the vicinity of the rolling surface 3 of the outboard row or a position on the outboard side of the rolling surface 3. A portion of the outer member 1 on the outboard side of the rolling surface 3 tends to deform in the radial direction relatively considerably to the load as compared with any other portion of the outer member 1. The sensor mounting member 94 is made of a material having a rigidity enough to avoid any deformation by the effect of an external force in a condition in which the sensor unit 93 is fitted to the casing 33.

For the displacement sensor used as the radially acting strain sensor 82, other than the eddy current type, any sensor of a magnetic type, an optical type, an ultrasonic type or a contact type, or a sensor of any other type than those listed above, which is capable of detecting the displacement can be employed. One of those various sensors can be selected to suit to various condition.

Since the structure is employed, in which the sensor unit 93 comprised of the sensor mounting member 94 and the radially acting strain sensor 82 fitted to such sensor mounting member 94 is fitted to the casing 33, the sensor for the detection of the vertically acting load can be installed compactly. Since the sensor mounting member 94 is a simple component part that is fitted to the outer member 1, fitting of the radially acting strain sensor 82 makes it possible to enhance the mass productivity and reduction in cost.

When the load is applied to the inner member 2, which is a hub of the vehicle drive wheel 70, by the effect of the vertically acting force imposed on the point of contact between the vehicle drive wheel 70 and the road surface, the outer member 1 undergoes a deformation through the rolling elements 5, accompanied by a displacement of the outer member 1 in the radial direction as a result of such deformation and the deformation of the outer member 1 in the radial direction brought about by such deformation is measured by the radial direction strain sensor 82 provided in the sensor mounting member 94 fitted to the outboard side of the casing 33 of the speed reducing mechanism C. Since as compared with the surroundings, the outer peripheral surface of the outer member 1, which is an object to be measured, is a site which displaces considerably in the radial direction, the displacement in the radial direction of the outer member 1 can be measured with a high sensitivity. Also, the action force in the vertical direction, acting on the point of contact of the vehicle drive wheel 70 and the road surface is calculated by using the radially acting strain so measured highly accurately, the vertical action force so calculated too will be highly accurate.

In the practice of the embodiment now under discussion, a frequency dividing circuit for dividing the frequency of the multiplied pulses outputted from the rotation detecting device 101 may be provided in the unit of the electric drive motor B so that a rotation signal of a high resolution, which can be obtained with the rotation detecting device 101 can be converted into a rotation signal suited to the resolution used in the standard ABS (anti-lock brake system). In such case, the high resolution rotation signal obtained with the rotation detecting device 101 can be used in the control of the electric drive motor B and, hence, any existing vehicle control device can be utilized with neither modification nor alteration being made thereto.

Although in describing the foregoing embodiment, reference has been made to the measurement of the axially acting strain and the radially acting strain, both occurring in the outer member 1, with the use of the axially acting strain sensor 81 and the radially acting strain sensor 82, respectively, arrangement may be made that the axially acting strain and the radially acting strain, both occurring in any other component such as, for example, the inner member 2, can be measured with the use of the axially acting strain sensor 81 and the radially acting strain sensor 82, respectively. Also, although in describing the foregoing embodiment of the present invention, reference has been made to the wheel support bearing assembly A of the third generation type, in which the inner member forms a portion of the hub, the present invention can be equally applied to the wheel support bearing assembly of the first or second generation type, in which the inner member and the hub of the wheel are separated from each other. In addition, the present invention can furthermore be applied to the wheel support bearing assembly of a tapered roller type regardless of the particular generation type.

By way of example, where the wheel support bearing device hereinbefore described is provided in each of four wheels of an automotive vehicle and the four wheels are independently driven by respective electric drive motors B, the algorithm for stabilizing the attitude of the automotive vehicle by detecting the respective numbers of revolutions of those vehicle drive wheels 70 with the rotation detecting device 101 of the structure hereinbefore described has to be configured.

Since this wheel support bearing device hereinbefore described is of the type employing the electrically powered brake utilizing the electric motor 50 for driving the brake pad 47, environmental contamination resulting from oil leakage tending to occur in a hydraulically driven brake can be avoided. Also, because of the electrically powered brake, the amount of movement of the brake pad 47 can be quickly adjusted and the response of the rotational velocity control of the left and right vehicle drive wheels during the cornering can be increased.

Also, the wheel support bearing device hereinbefore described is such that the attenuating section 74 of the suspension system 73 is actuated electrically and, therefore, the response of suspension control can be increased and the attitude of the automotive vehicle can also be stabilized.

Figure 21:
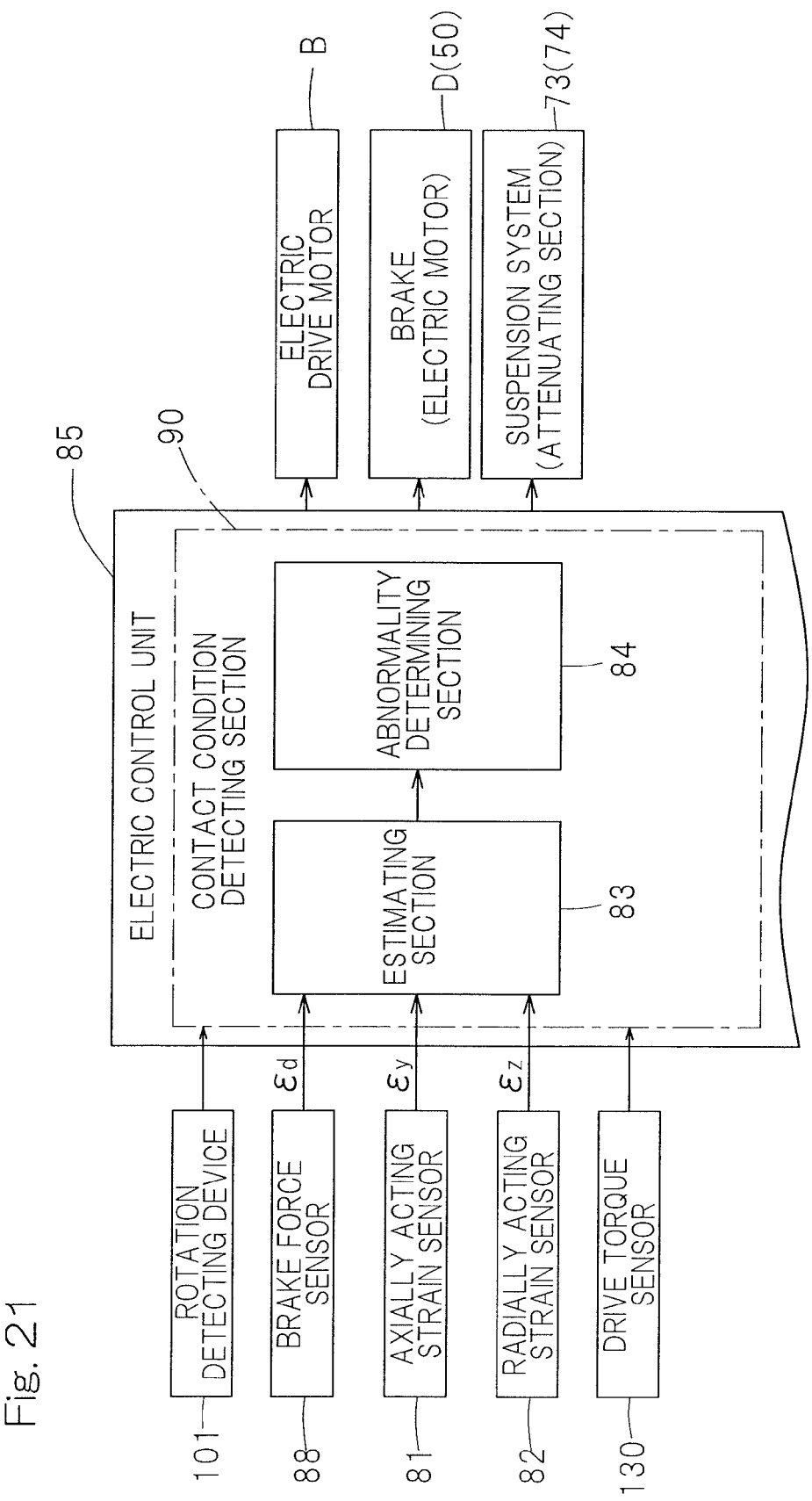
FIG. 21 is a block diagram showing another control system.

The control system employed in the practice of the foregoing embodiment has been described in which the action force Fx acting on the point of contact between the vehicle drive wheel 70 and the road surface in the direction parallel to the direction of travel is determined from the output of the current sensor 80 used to detect the electric current value I of the electric drive motor B, but arrangement may be so made that as shown in FIG. 21, the action force Fx acting in the direction parallel to the direction of travel can be determined from the output of the brake force sensor 88 used to detect the brake force εd applied to the brake pad 47 of the brake D.

Since the magnitude of the brake force applied to the brake pad 47 of the brake D varies depending on the magnitude of the action force acting on the point of contact of the vehicle drive wheel 70 with the road surface in the direction parallel to the direction of travel, the magnitude of the above described action force can be calculated if the relation between the action force and the brake force is determined beforehand by means of a series of experiments and/or simulations. The estimating section 83 can calculate the action force, acting on the point of contact between the vehicle drive wheel and the road surface in the direction parallel to the direction of travel, by referring to the relation between the action force in the direction parallel to the direction of travel and the brake force so determined by means of the experiments and/or simulations.

Figure 22:
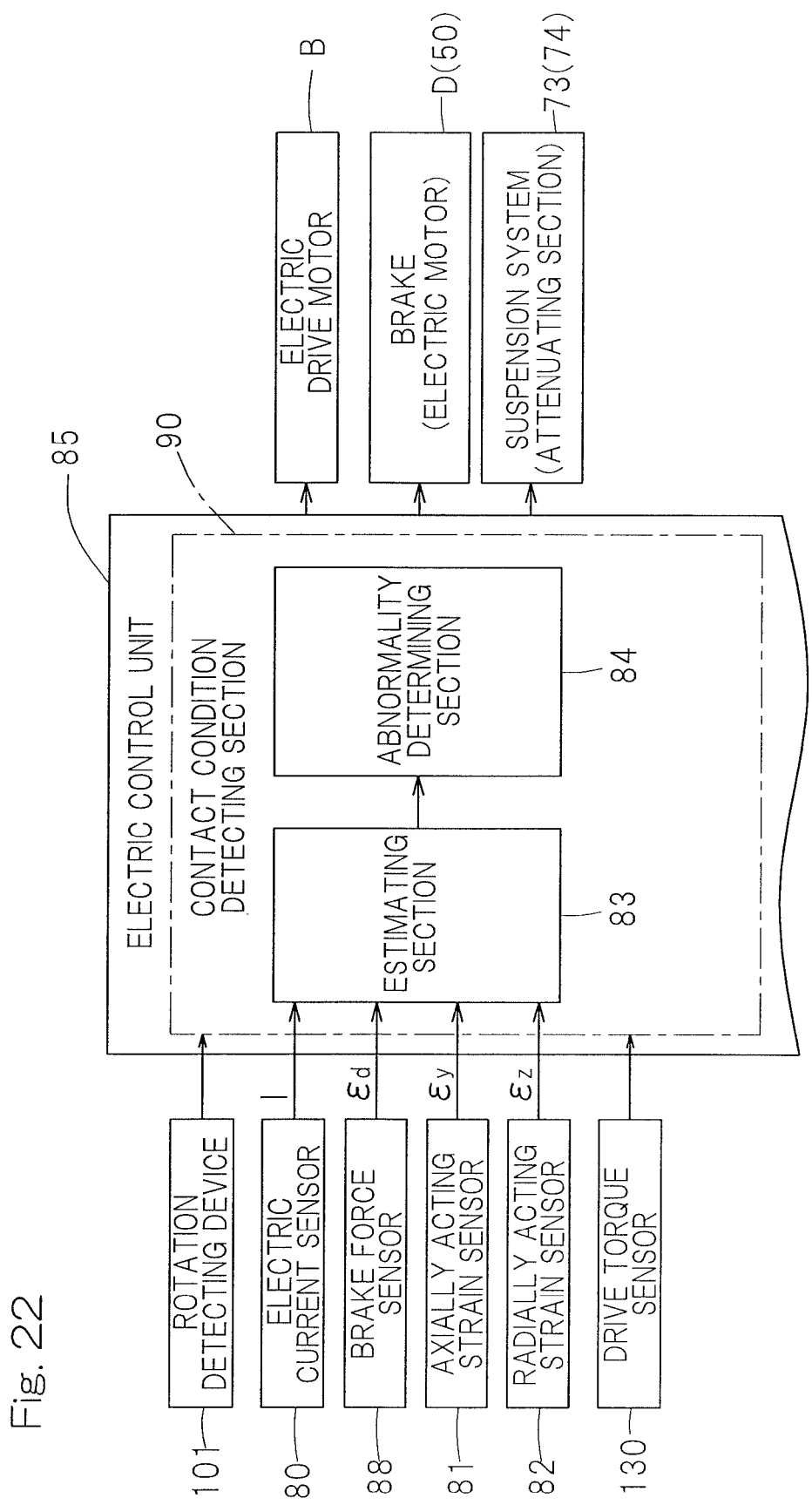
FIG. 22 is a block diagram showing still another control system.

Also, if as shown in FIG. 22, arrangement is so made that the action force Fx acting on the point of contact of the vehicle drive wheel 70 with the road surface in the direction parallel to the direction of travel can be determined by comparing the output of the current sensor 80 for detecting the electric current value I of the electrically driven motor B and the output of the brake force sensor 88 for detecting the brake force εd applied to the brake pad 47 of the brake D, the detecting accuracy of the action force Fx acting in the direction parallel to the direction of travel can be increased.

Where the brake D is of a hydraulically driven brake, the strain sensor may be fitted to a member for receiving a load when a pressing force is applied to the brake pad, such as a brake caliper, so that the action force acting on the point of contact between the vehicle drive wheel and the road surface can be determined from an output of the strain sensor.

Although in the foregoing description, the drive of the electric drive motor B, the actuation of the brake D and the operation of the suspension system 73 have been described as controlled from the respective outputs of the sensors 80, 81 and 82 for measuring the action forces acting on the point of contact between the vehicle drive wheel 70 and the road surface in the three axis directions, it is rather desirable in accomplishing the control faithful to the actual travel if the above described various controls are performed with the additional use of a signal from the steering device. Also, the wheel support bearing device designed according to the present invention may be installed on some or all of wheels of any automotive vehicle.

Figure 23:
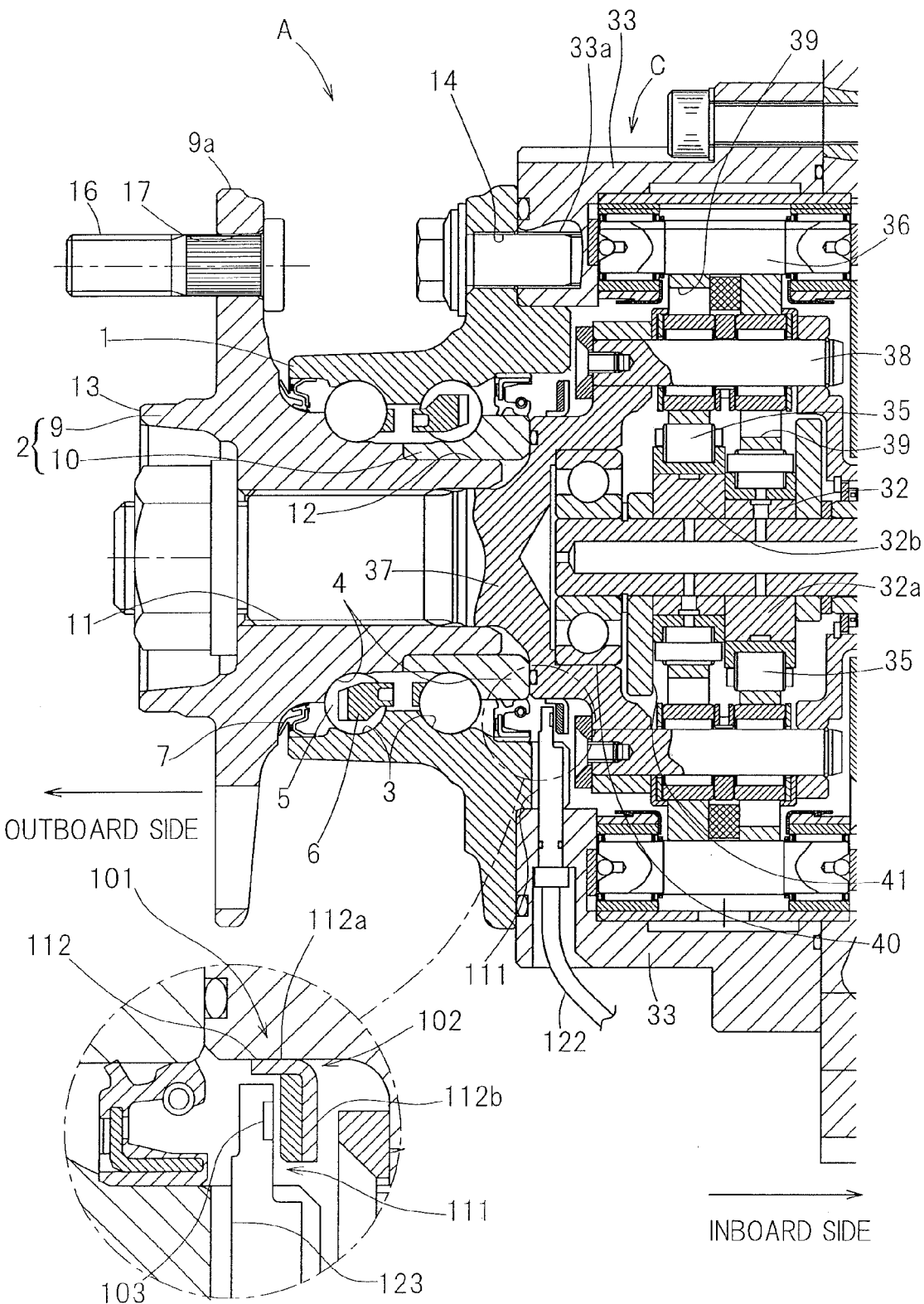
FIG. 23 is a sectional view showing a wheel support bearing assembly and a speed reducing mechanism, both employed in the sensor equipped and in-wheel motor incorporated bearing device for the support of the vehicle wheel, which is designed in accordance with a second preferred embodiment of the present invention, and an enlarged sectional view showing the mounting portion for the rotation detecting device employed in the bearing device.

FIG. 23 illustrates a second preferred embodiment of the present invention. According to this second embodiment, in the sensor equipped and in-wheel motor incorporated wheel support bearing device designed according to, and shown and described in connection with, the first embodiment of the present invention, the encoder 102 of the rotation detecting device 101 is provided in an outer periphery of the output shaft 37 of the speed reducing mechanism C. The encoder 102 in this case is of an axial type similar to that shown in and described with reference to FIGS. 8A and 8B. In the encoder 102 a plurality of magnetic pole pairs 102a are equidistantly arranged and magnetized in the circumferential direction of that side face of a flanged portion 112b extending radially outwardly from one end of a cylindrical portion 112a of a ring shaped core metal 112 of, for example, an L-sectioned shape. With the cylindrical portion 112a of the core metal 112 press fitted into the outer peripheral surface of the output shaft 37, the encoder 102 is fitted to the outer periphery of the output shaft 37 of the speed reducing mechanism C in a fashion with the side face of the encoder 102 having the magnetic pole pairs 102 oriented towards the outboard side. The sensor side unit 111 having the sensor 103 built therein is fitted by insertion into a sensor mounting hole 123 extending radially through the outboard end of the casing 33 of the speed reducing mechanism C, so that the sensor 103 disposed at the tip of the unit 111 can be held radially in face to face relation to the side face having the magnetic pole pairs 102a of the encoder 102 with a gap intervening therebetween.

Even in this instance, a gap between the inner peripheral surface of the sensor mounting hoe 123 and the sensor side unit 111 is fixedly sealed by means of, for example, a contact sealing member such as, for example, an O-ring, a bonding agent or a screw. Other structural features are similar to those of the first embodiment of the present invention hereinbefore described.

Figure 24:
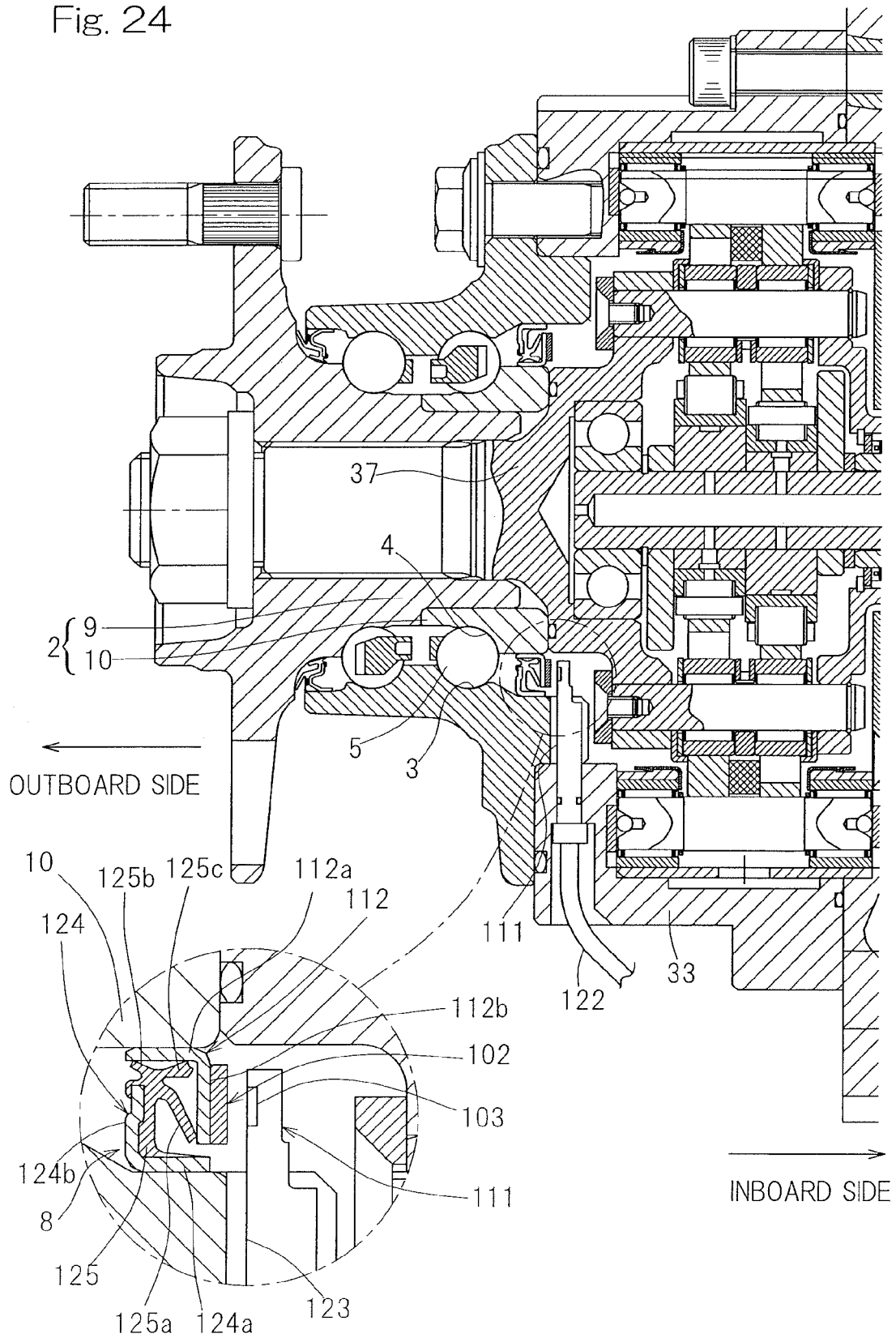
FIG. 24 is a sectional view showing a wheel support bearing assembly and a speed reducing mechanism, both employed in the sensor equipped and in-wheel motor incorporated bearing device for the support of the vehicle wheel, which is designed in accordance with a third preferred embodiment of the present invention, and an enlarged sectional view showing the mounting portion for the rotation detecting device employed in the bearing device.

FIG. 24 illustrates a third preferred embodiment of the present invention. According to this third embodiment, in the sensor equipped and in-wheel motor incorporated wheel support bearing device designed according to, and shown and described in connection with, the second embodiment of the present invention, the encoder 102 of the rotation detecting device 101 is provided as a part of the sealing member 8 employed in the wheel support bearing assembly A to seal the inboard end of the annular space delimited between the outer member 1 and the inner member 2. In other words, the sealing member 8 employed in this case is made up of an encoder 102 of an axial type and a separate sealing place 124 slidably engageable therewith as a slinger. The encoder 102 is fitted to the outer peripheral surface of the inner ring 10 of the inner member 2. In this case, the side face having the magnetic pole pairs 102*a* of the encoder 102 is so disposed as to confront the inboard side. The sensor side unit 111 is inserted into and hence fitted to the sensor mounting hole 123 extending radially through the outboard end of the casing 33 of the speed reducing mechanism C. The sensor 103 disposed at the tip of the unit 111 radially confronts the side face of the encoder 102, where the magnetic pole pairs 102*a* are magnetized, with a gap intervening therebetween are similar to those described in connection with the previously described second embodiment of the present invention with particular reference to FIG. 23.

The sealing plate 124 referred to above is an annular member of an L-sectioned configuration including a cylindrical portion 124*a*, adapted to be press fitted into the inner peripheral surface of the outer member 1, and a radial extending flanged portion 124*b* extending radially inwardly from the outboard end of the cylindrical portion 124*a*. The sealing plate 124 is of one piece construction including a slide lip 125*a* slidingly engageable with the core metal flanged portion 112*b* of the encoder 102 and radial lips 125*b* and 125*c* slidingly engageable with the core metal cylindrical portion 112*a*. Those lips 125*a* to 125*c* are provided as respective parts of an elastic member 125 bonded by vulcanization to the sealing plate 124. The cylindrical portion 124*a* of this sealing plate 124 and the core metal flanged portion 112*b* of the encoder 102 are held in face to face relation with a radial gap intervening therebetween, and such gap forms a labyrinth seal. Other structural features are similar to those employed in the first embodiment of the present invention shown in and described with particular reference to FIGS. 1 to 22.

As hereinabove described, since in this embodiment, the encoder 102 provided at the inboard end of the inner member 1 of the wheel support bearing assembly A is provided in a part of the inboard sealing member 8, the rotation detecting device 101 can be fitted to the inboard end of the wheel support bearing assembly A without impairing the sealability at the inboard end of the wheel support bearing assembly A.

Figure 25:
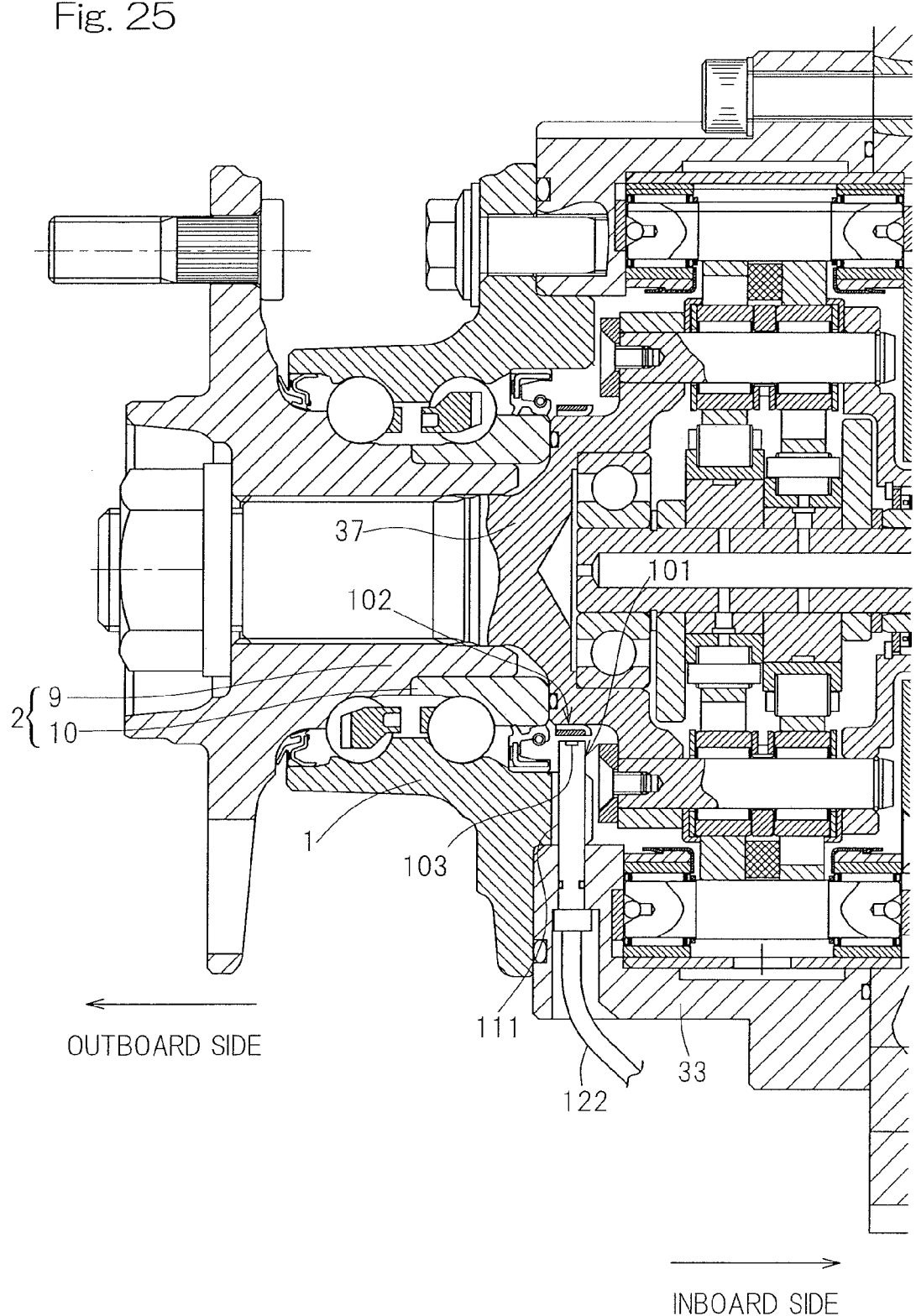
FIG. 25 is a sectional view showing a wheel support bearing assembly and a speed reducing mechanism, both employed in the sensor equipped and in-wheel motor incorporated bearing device for the support of the vehicle wheel, which is designed in accordance with a fourth preferred embodiment of the present invention.

FIG. 25 illustrates a fourth preferred embodiment of the present invention. According to this embodiment, in the sensor equipped and in-wheel motor incorporated wheel support bearing device designed according to the first embodiment of the present invention as in FIG. 2, the encoder 102 of the rotation detecting device 101 is fitted to the outer peripheral surface of the output shaft 37 of the speed reducing mechanism C and the sensor side unit 111 is provided at the outboard end of the casing 33 of the speed reducing mechanism C. Other structural features are similar to those employed in the first embodiment of the present invention shown in and described with particular reference to FIGS. 1 to 22.

It is to be noted that although in describing any one of the foregoing embodiments of the present invention, the hub has been shown and described as comprised of the hub ring 9 that is a component part of, for example, the inner member of the wheel support bearing assembly, the present invention can be equally applied to the wheel support bearing device in which the hub employed as a member separate from the wheel support bearing assembly is employed.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Outer member (Stationary raceway ring)
2 . . . Inner member (Rotatable raceway ring)
3, 4 . . . Raceway surface
8 . . . Sealing member
9 . . . Hub ring (Hub)
37 . . . Output shaft of a speed reducing mechanism
70 . . . Vehicle drive wheel
80 . . . Current sensor
81 . . . Axially acting strain sensor
82 . . . Radially acting strain sensor
83 . . . Load estimating section
88 . . . Braking force sensor
90 . . . Contact condition detecting section
100 . . . Output cable of an electric drive motor
101 . . . Rotation detecting device
102 . . . Encoder
102*a* . . . Magnetic pole pair
103 . . . Sensor
104 . . . Multiplying section
105 . . . Velocity detecting section
122 . . . Output cable of the rotation detecting device
A . . . Wheel support bearing assembly
B . . . Electric drive motor
C . . . Speed reducing mechanism
D . . . Brake

What is claimed is:
1. A sensor equipped and in-wheel motor incorporated bearing device for a vehicle wheel, which device comprises:
a wheel support bearing assembly for rotatably supporting a hub of a vehicle drive wheel, the wheel support bearing assembly including an outer member serving as a stationary raceway ring and an inner member, the outer and inner members defining a bearing space therebetween, an inboard end of the annular bearing space being sealed by a sealing member;
an electric drive motor forming a rotation drive source for the vehicle drive wheel;
a speed reducing mechanism interposed between the electric drive motor and the wheel support bearing assembly, the speed reducing mechanism including a casing to which the outer member is secured, the casing including a sensor mounting hole extending radially through the outboard end thereof; and
a rotation detecting device for detecting the rotation of an output shaft of the speed reducing mechanism, wherein the electric drive motor is arranged at the inboard side of the wheel support bearing assembly through the speed reducing mechanism, and the rotation detecting device is provided in the inboard side of the sealing member which is the outside of the bearing space and includes a sensor side unit fitted by insertion into the sensor mounting hole, the sensor side unit having a sensor at a tip thereof, the sensor being disposed in an annular space formed between the inboard end of the stationary raceway ring of the wheel support bearing assembly and the output shaft of the speed reducing mechanism.

2. The sensor equipped and in-wheel motor incorporated bearing device for the vehicle wheel as claimed in claim 1, wherein the rotation detecting device comprises an encoder provided in a rotatable raceway ring of the wheel support bearing assembly or a member secured to such rotatable raceway ring and having a plurality of to-be-detected magnetic poles arranged equidistantly in a circumferential direction thereof, a sensor provided in a member secured to such stationary raceway ring for detecting the to-be-detected magnetic poles of the encoder to generate pulses, and a multiplying section for multiplying the pulses, generated by the sensor, to form multiplied pulses.

3. The sensor equipped and in-wheel motor incorporated bearing device for the vehicle wheel as claimed in claim 2, wherein the rotation detecting device comprises a velocity detecting section for detecting an average velocity of the encoder during the interval in the past, in which the latest pieces of the multiplied pulses have been formed, each time the multiplying section forms the multiplied pulse, the number of the pieces of the multiplied pulses being equal to a multiplication factor.

4. The sensor equipped and in-wheel motor incorporated bearing device for the vehicle wheel as claimed in claim 1, further comprising:

a contact condition detecting section for calculating a change in rotational velocity detected by the rotation detecting device to output information descriptive of a condition of contact of the vehicle drive wheel with a road surface.

5. The sensor equipped and in-wheel motor incorporated bearing device for the vehicle wheel as claimed in claim 4, further comprising:

a brake for applying a brake force to the hub of the vehicle drive wheel, and wherein the contact condition detecting section is operable, in addition to the calculation of the change in rotational velocity, to output information descriptive of the contact condition by utilizing respective estimated values or respective measured values of a drive torque of the electric drive motor and a brake force acting on the brake.

6. The sensor equipped and in-wheel motor incorporated bearing device for the vehicle wheel as claimed in claim 1, wherein an output cable extending from the rotation detecting device and an output cable extending from a control unit of the electric drive motor are bundled together.

7. The sensor equipped and in-wheel motor incorporated bearing device for the vehicle wheel as claimed in claim 1, wherein an encoder of the rotation detecting device is provided in an inboard end of the wheel support bearing assembly.

8. The sensor equipped and in-wheel motor incorporated bearing device for the vehicle wheel as claimed in claim 7, wherein the encoder of the rotation detecting device is provided as a part of a sealing member used to seal an inboard end of an annular space delimited between a stationary raceway ring and a rotatable raceway ring, both forming respective parts of the wheel support bearing assembly.

9. The sensor equipped and in-wheel motor incorporated bearing device for the vehicle wheel as claimed in claim 1, wherein an encoder of the rotation detecting device is provided on an output shaft of the speed reducing mechanism.

10. The sensor equipped and in-wheel motor incorporated bearing device for the vehicle wheel as claimed in claim 1, further comprising:

an electric current sensor for measuring a electric current value of the electric drive motor; and a load estimating section for estimating a force, acting on the point of contact of the vehicle drive wheel with a road surface in a direction parallel to a direction of travel, from an output of the electric current sensor.

11. The sensor equipped and in-wheel motor incorporated bearing device for the vehicle wheel as claimed in claim 1, further comprising:

a brake for applying a brake force to the hub of the vehicle drive wheel;

a braking force sensor for measuring the brake force applied to the brake; and a load estimating section for estimating a force, acting on the point of contact of the vehicle drive wheel with a road surface in a direction parallel to a direction of travel, from an output of the braking force sensor.

12. The sensor equipped and in-wheel motor incorporated bearing device for the vehicle wheel as claimed in claim 1, further comprising:

a strain sensor provided in a stationary raceway ring of the wheel support bearing assembly for measuring a strain occurring in the stationary raceway ring; and a load estimating section for estimating, from an output of the strain sensor, at least a force acting in one axis direction of forces acting on the point of contact of the vehicle drive wheel with a road surface in three axis directions that are perpendicular to each other.

13. The sensor equipped and in-wheel motor incorporated bearing device for the vehicle wheel as claimed in claim 1, further comprising:

at least three or more strain sensors provided in a stationary raceway ring of the wheel support bearing assembly for measuring strains in the stationary raceway ring; and a load estimating section for estimating, from respective outputs of the strain sensors, forces acting on the point of contact of the vehicle drive wheel with a road surface in three axis directions that are perpendicular to each other.

* * * * *